(12) United States Patent
Gold et al.

(10) Patent No.: US 10,821,718 B2
(45) Date of Patent: Nov. 3, 2020

(54) SELECTIVE POWDER PROCESSING DURING POWDER BED ADDITIVE MANUFACTURING

(71) Applicant: GENERAL ELECTRIC COMPANY, Schenectady, NY (US)

(72) Inventors: Scott Alan Gold, Waynesville, OH (US); Christian Stevenson, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 15/631,965

(22) Filed: Jun. 23, 2017

(65) Prior Publication Data
US 2018/0370213 A1    Dec. 27, 2018

(51) Int. Cl.
| | |
|---|---|
| *B29C 64/321* | (2017.01) |
| *B33Y 10/00* | (2015.01) |
| *B29C 65/00* | (2006.01) |
| *B33Y 30/00* | (2015.01) |
| *B33Y 40/00* | (2020.01) |
| *B29C 64/153* | (2017.01) |
| *B22F 3/105* | (2006.01) |
| *B29C 64/188* | (2017.01) |
| *G01N 21/33* | (2006.01) |
| *B29L 9/00* | (2006.01) |
| *B29K 23/00* | (2006.01) |
| *B29K 105/16* | (2006.01) |

(52) U.S. Cl.
CPC ............ *B33Y 10/00* (2014.12); *B22F 3/1055* (2013.01); *B29C 64/153* (2017.08); *B29C 64/188* (2017.08); *B29C 64/321* (2017.08); *B29C 66/73* (2013.01); *B33Y 30/00* (2014.12); *B33Y 40/00* (2014.12); *B22F 2003/1056* (2013.01); *B29C 66/40* (2013.01); *B29K 2023/00* (2013.01); *B29K 2105/16* (2013.01); *B29L 2009/005* (2013.01); *G01N 21/33* (2013.01)

(58) Field of Classification Search
CPC .................................................. B29C 64/321
See application file for complete search history.

(56) References Cited

U.S. PATENT DOCUMENTS

| | | | |
|---|---|---|---|
| 3,565,676 | A | 2/1971 | Holzl |
| 3,594,216 | A | 7/1971 | Charles et al. |
| 3,656,995 | A | 4/1972 | Reedy, Jr. |
| 5,183,685 | A | 2/1993 | Yamazaki |
| 5,241,245 | A | 8/1993 | Barnes et al. |

(Continued)

OTHER PUBLICATIONS

Gujba et al., "Laser Peening Process and Its Impact on Materials Properties in Comparison with Shot Peening and Ultrasonic Impact Peening," Materials, 2014, vol. 7, pp. 7925-7974.

(Continued)

*Primary Examiner* — Joseph A Miller, Jr.
(74) *Attorney, Agent, or Firm* — Dority & Manning, P.A.

(57) ABSTRACT

The present disclosure generally relates to methods and apparatuses for secondary material deposition and insert deposition during additive manufacturing (AM) processes. Such methods and apparatuses can be used to embed chemical signatures into manufactured objects, and such embedded chemical signatures may find use in anti-counterfeiting operations and in manufacture of objects with multiple materials.

10 Claims, 19 Drawing Sheets

(56) References Cited

U.S. PATENT DOCUMENTS

| | | |
|---|---|---|
| 5,304,282 A | 4/1994 | Flamm |
| 5,387,380 A | 2/1995 | Cima et al. |
| 5,656,329 A | 8/1997 | Hampden-Smith et al. |
| 6,475,902 B1 | 11/2002 | Hausmann et al. |
| 6,492,651 B2 | 12/2002 | Kerekes |
| 6,548,899 B2 | 4/2003 | Ross |
| 6,743,473 B1 | 6/2004 | Parkhe et al. |
| 6,861,613 B1 | 3/2005 | Meiners et al. |
| 7,045,738 B1 | 5/2006 | Kovacevic et al. |
| 7,148,448 B2 | 12/2006 | Warren et al. |
| 7,217,102 B2 | 5/2007 | Rockstroh et al. |
| 7,585,450 B2 | 9/2009 | Wahlstrom et al. |
| 7,621,733 B2 | 11/2009 | Reynolds et al. |
| 7,690,909 B2 | 4/2010 | Wahlstrom |
| 7,850,885 B2 | 12/2010 | Philippi et al. |
| 8,017,055 B2 | 9/2011 | Davidson et al. |
| 8,222,567 B2 | 7/2012 | Mathai et al. |
| 8,506,836 B2 | 8/2013 | Szuromi et al. |
| 9,126,167 B2 | 9/2015 | Ljungblad |
| 2002/0106412 A1 | 8/2002 | Rowe et al. |
| 2006/0071367 A1* | 4/2006 | Hunter ............... B28B 1/001 264/308 |
| 2007/0126157 A1* | 6/2007 | Bredt ................. B33Y 30/00 264/334 |
| 2008/0241404 A1 | 10/2008 | Allaman et al. |
| 2009/0286007 A1 | 11/2009 | Brancher et al. |
| 2014/0265049 A1 | 9/2014 | Burris et al. |
| 2014/0308153 A1 | 10/2014 | Ljungblad |
| 2014/0361464 A1 | 12/2014 | Holcomb |
| 2015/0177158 A1 | 6/2015 | Cheverton |
| 2015/0290881 A1 | 10/2015 | Ederer et al. |
| 2016/0067779 A1 | 3/2016 | Dautova et al. |
| 2016/0067827 A1* | 3/2016 | Zediker ............ B23K 26/342 219/76.12 |
| 2016/0311164 A1 | 10/2016 | Miyano |
| 2017/0072636 A1* | 3/2017 | Ng .................... B29C 31/02 |

OTHER PUBLICATIONS

Peyre et al., "Laser shock processing: a review of the physics and applications," Optical and Quantum Electronics, vol. 27, 1995, pp. 1213-1229.

* cited by examiner

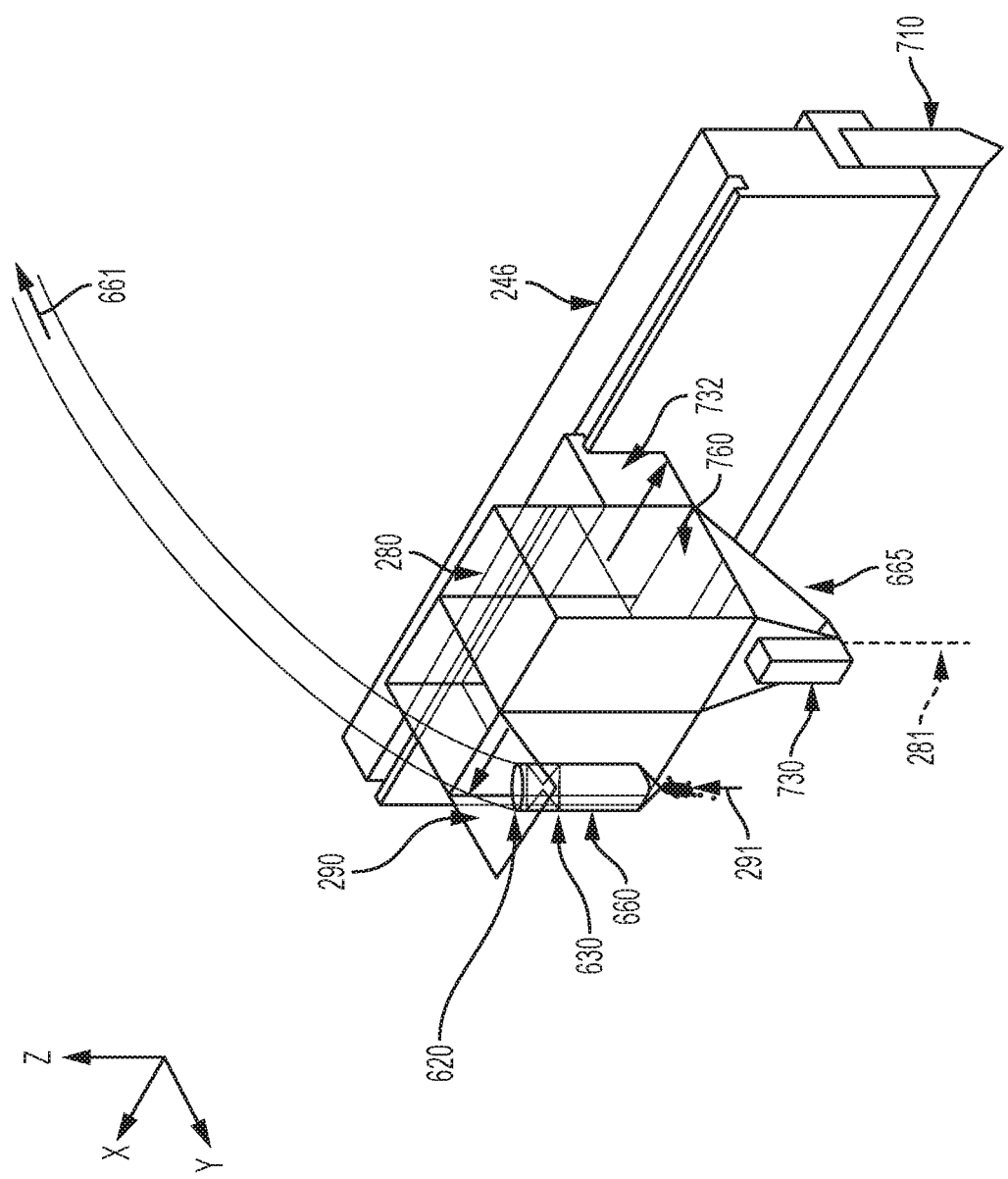

SELECTIVE POWDER PROCESSING DURING POWDER BED ADDITIVE MANUFACTURING

INTRODUCTION

The present disclosure generally relates to methods and apparatuses for selective powder removal, secondary powder deposition, and selective placement of inserts during additive manufacturing (AM) processes. Most commercially available AM machines can be used to build components of only a single material. The methods and systems of the present disclosure may be used to integrate a secondary material which would allow additional or improved functionality of many AM components, and allow addition of chemical signatures while making various objects, including components having polymerized inner core portions and well defined outer surfaces, and in processes utilizing these components.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object.

An example of an apparatus for AM using a powdered build material is shown in FIG. 1. The apparatus 140 builds objects or portions of objects, for example, the object 152, in a layer-by-layer manner by sintering or melting a powder material (not shown) using an energy beam 170 generated by a source 150, which can be, for example, a laser for producing a laser beam, or a filament that emits electrons when a current flows through it. The powder to be melted by the energy beam is supplied by reservoir 156 and spread evenly over a powder bed 142 using a recoater arm 146 travelling in direction 164 to maintain the powder at a level 148 and remove excess powder material extending above the powder level 148 to waste container 158. The energy beam 170 sinters or melts a cross sectional layer of the object being built under control of an irradiation emission directing device, such as a laser galvo scanner 162. The galvo scanner 162 may comprise, for example, a plurality of movable mirrors or scanning lenses. The speed at which the energy beam is scanned is a critical controllable process parameter, impacting the quantity of energy delivered to a particular spot. Typical energy beam scan speeds are on the order of 10 to 1000 millimeters per second. The build platform 144 is lowered and another layer of powder is spread over the powder bed and object being built, followed by successive melting/sintering of the powder by the laser 150. The powder layer is typically, for example, 10 to 100 microns in thickness. The process is repeated until the object 152 is completely built up from the melted/sintered powder material. The energy beam 170 may be controlled by a computer system including a processor and a memory (not shown). The computer system may determine a scan pattern for each layer and control energy beam 170 to irradiate the powder material according to the scan pattern. After fabrication of the object 152 is complete, various post-processing procedures may be applied to the object 152. Post-processing procedures include removal of excess powder by, for example, blowing or vacuuming. Other post processing procedures include a stress relief heat treat process. Additionally, thermal and chemical post processing procedures can be used to finish the object 152.

Most commercial AM machines allow components to be built from only a single component material. For example, powder bed 142 and powder reservoir 156 of the system illustrated in FIG. 1 allow for only a single powder material feedstock to be used to fabricate a component. Incorporation of one or more additional materials into the component may be desirable in many cases. For example, coatings could be added to a component during the additive process for wear or chemical resistance eliminating the need for a post process operation. With rapid maturation of AM technology, more accurate printers and modeling tools may become available at decreasing cost. Accordingly, inexpensive replicas of objects may flood the market, and such replicas may be of inferior quality compared to the original, genuine part. However, neither the consumer nor the manufacturer may be able to distinguish originals from replicas upon simple visual inspection of the intact object. Therefore, it is desirable to be able to chemically or physically mark parts—on or below the surface—during AM processes with distinct signatures, to help consumers and manufacturers alike tell apart original, genuine parts from inexpensive, inferior replicas.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In one aspect, the present disclosure is directed to a method of fabricating an object, comprising steps (a) to (d). Step (a) involves fusing at least a portion of a given layer of a first build material to form at least one fused region. Step (b) involves providing a subsequent layer of the first build material. Step (c) involves repeating steps (a) and (b) until the object is formed. Step (d) involves at least one step of removing a portion of the subsequent layer of the first build material to expose a portion of the fused region through the subsequent layer of build material, during or after forming of the object. In some aspects, the removing is done by vacuum. In some aspects, the method further comprises at least one step of depositing a second build material or insert consisting of a pre-fused portion of the second build material and moving a recoater arm after depositing the second build material or insert. In some aspects, the second build material or insert is deposited over at least a portion of the fused region. In some aspects, the fusing comprises irradiating with a laser beam or with an electron beam. In some aspects, the fusing comprises binder jetting. In some aspects, the second build material or insert has different electromagnetic absorption or reflection characteristics from the first build material. In some aspects, the absorption or reflection characteristics are measured using x-rays, ultraviolet, infrared, or computed tomography methods. In some aspects, the second build material or insert is more opaque to x-ray radiation, more opaque to radioactivity, has a different absorbance energy in the fused state as measured by computed tomography (CT) scanning, has different mechanical wear properties, has greater corrosion resistance, has different infrared (IR) emissivity, has different IR absorptivity or reflectivity, has different ultraviolet (UV) absorptivity or reflectivity, has a different secondary x-ray emission energy profile, has a different neutron scattering profile, has a different surface energy, has a different coefficient of friction, has a different thermal conductivity, has different acoustic propagation properties, has different fatigue resistance, has different mechanical properties, has different wear resistance, has different tribology characteristics, has different electrical conductivity, or has different surface properties than the first build material in the fused state. In some aspects, the second build material or insert has a different density than the first build material in the fused state.

In another aspect, the present disclosure is directed to a method of fabricating an object, comprising steps (a) to (d). Step (a) involves fusing at least a portion of a given layer of a first build material, to form a fused region. Step (b) involves providing a subsequent layer of the first build material. Step (c) involves repeating steps (a) and (b) until the object is formed. Step (d) involves at least one step of selectively depositing a second build material or insert consisting of a pre-fused portion of the second build material over at least portion of the subsequent layer of the first build material, to form a bilayer of the first build material and the second build material, and fusing the bilayer of the first build material and the second build material, to form a fused region of the fused first build material and the fused second build material, during or after forming of the object. In some aspects, the second build material or insert is deposited over at least a portion of the exposed portion of the fused region. In some aspects, the second build material or insert has different electromagnetic absorption or reflection characteristics from the first build material. In some aspects, the absorption characteristics are measured using x-rays, ultraviolet, infrared, or computed tomography methods.

In another aspect, the present disclosure is directed to an apparatus for forming an object by additive manufacturing, comprising: a mechanism for providing a layer of powder; a mechanism for selectively fusing at least a portion of the layer of powder to provide a fused region; and a powder removal unit for removing a portion of the layer of powder to expose a portion of the fused region through the layer of powder during or after forming of the object, the powder removal unit movable in at least two dimensions. In some aspects, the mechanism for providing a layer of powder comprises a recoater arm. In some aspects, the apparatus further comprises a second powder dispenser or an insert dispenser. In some aspects, the second powder dispenser or insert dispenser is on the recoater arm. In some aspects, the mechanism for selectively fusing at least a portion of the layer of powder comprises an energy source. In some aspects, the energy source is a laser source. In some aspects, the energy source is an electron beam source. In some aspects, the recoater arm comprises a recoater blade. In some aspects, the powder removal unit is on the recoater arm. In some aspects, the second powder dispenser or insert dispenser is on a positioning unit.

These and other aspects of the invention will become more fully understood upon a review of the detailed description, which follows.

BRIEF DESCRIPTION OF THE DRAWINGS

FIG. 2F shows an example of a dispenser unit and a vacuum unit attached to a recoater arm according to a first embodiment of the present disclosure.

DETAILED DESCRIPTION

Figure 1:
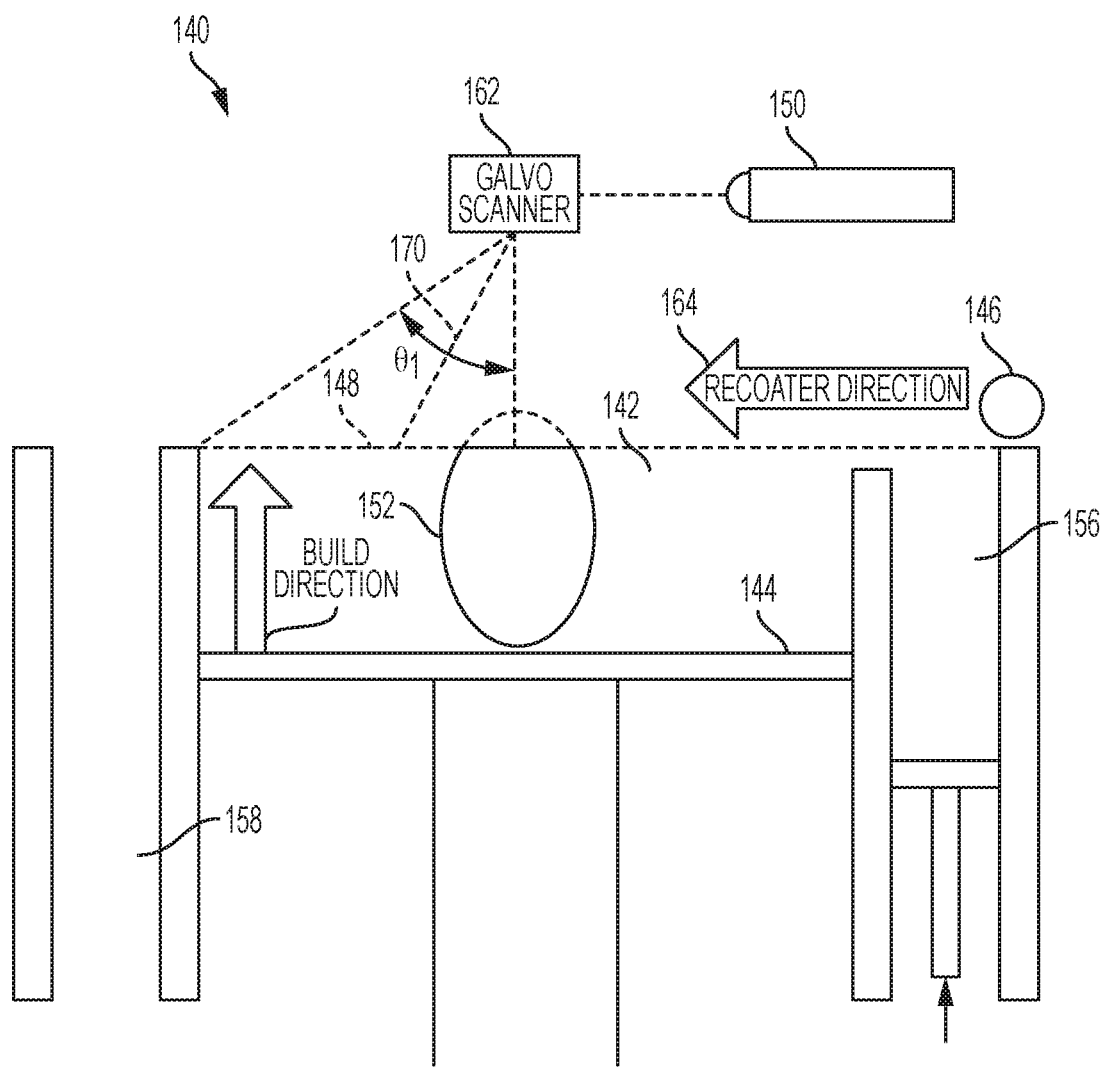
FIG. 1 shows an example of an apparatus for AM according to conventional methods.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present application is directed to methods and apparatuses for selective placement of inserts and secondary powders during additive manufacturing (AM) processes. These processes may be used during AM processes to add chemical signatures during manufacturing, thus facilitating the process of telling original products apart from replicas that may be of inferior quality.

According to the present disclosure, a dispenser is used to deposit a second build material or an insert within a layer of an object being built in a layer-by-layer manner by an AM process. Deposition of a second build material in this manner may occur on a recently solidified layer, or component layer, such as in a vacuumed out space created in a powder layer prior to solidification or fusing of that powder material into a component layer, or upon powder prior to solidification or fusing of that powder material into a component layer. Deposition of an insert in this manner may occur in a vacuumed out space in a powder layer prior to solidification or fusing of the powder. The component layer may be the first layer, the final layer, or an intermediate layer of the object being built. However, by depositing a second build material or an insert after building the first layer but before building the final layer of the object during AM, an identifying marker may be able to be placed out of sight of would-be copycats, thereby making it harder for would-be copycats to produce replicas of the object and making it easier to identify replicas or counterfeits. Objects built in such a manner, with internal chemical or physical markers, may be able to be identified by spectroscopic or imaging methods by the consumer, the manufacturer, or a third party. Alternatively, AM according to the methods of the present disclosure may also form objects built from multiple materials, with added materials conferring properties such as, but not limited to, greater mechanical resistance, greater corrosion resistance, and greater electrical conductivity.

As used herein, a material is "opaque" to radiation if the material does not transmit incoming radiation.

As used herein, "radiation" refers to energy in the form of waves or particles, including, but not limited to, heat, radio waves, visible light, x-rays, radioactivity, acoustic radiation, and gravitational radiation.

As used herein, a "contrast agent" is a substance used to enhance the contrast of structures or fluids within an object in imaging applications.

FIGS. 2A-5C show schematic diagrams of an apparatus according to some embodiments of the present disclosure.

Figure 2A:
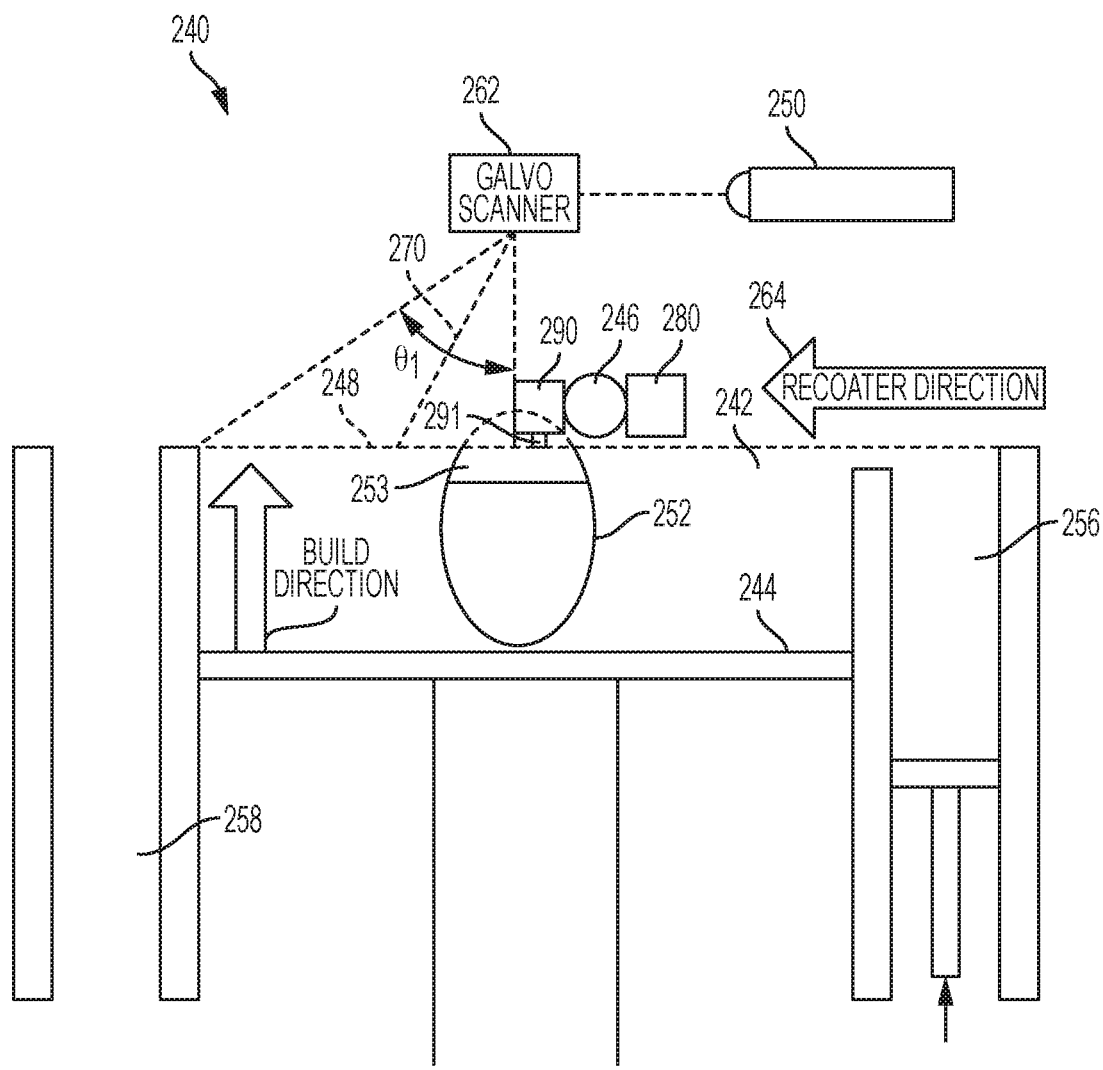
FIG. 2A shows a schematic diagram of vacuum removal of build material during AM according to a first embodiment of the present disclosure.

According to some embodiments of the present disclosure, apparatus 240 may be equipped with a dispenser unit 280. In a first embodiment, dispenser unit 280 may be attached to a mechanism for providing a layer of powder, such as a recoater mechanism, such as recoater arm 246 (FIG. 2A). In some aspects, apparatus 240 may be equipped with a powder removal unit, such as vacuum unit 290. In some aspects, vacuum unit 290 is attached to a mechanism for providing a layer of powder, such as a recoater mechanism, such as recoater arm 246. In a first embodiment, both vacuum unit 290 and dispenser unit 280 are attached to the recoater mechanism (FIG. 2A). The positioning unit 283 is shown in further detail in FIG. 2F.

Figure 5A:
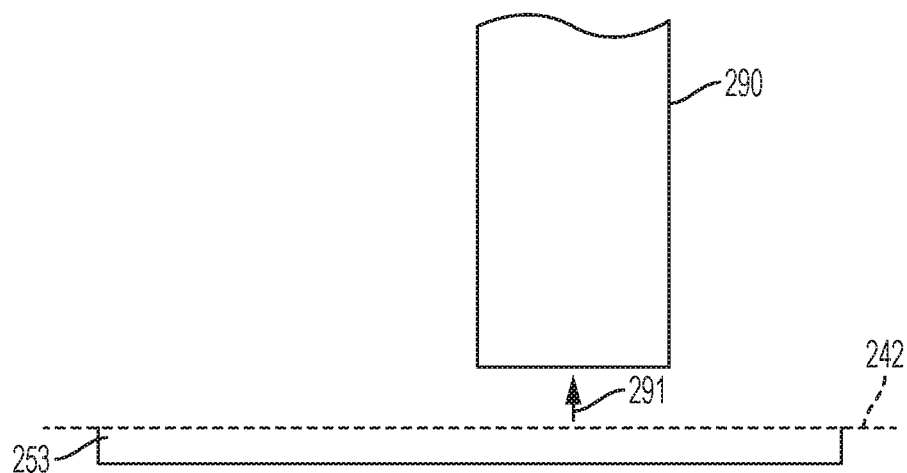
FIG. 5A shows a close-up view of a schematic of the build surface during vacuum removal of build material during AM according to some embodiments of the present disclosure.

After the formation of at least one fused or solidified region of a first build material into a component layer, during the manufacture of an object 252, and subsequent deposition of a subsequent layer 253 of the first build material, vacuum unit 290 removes by vacuum a portion of the subsequent layer 253 of the first build material, along path 291 (FIG. 2A). FIG. 5A shows a close-up view of the build surface at this step.

Figure 2B:
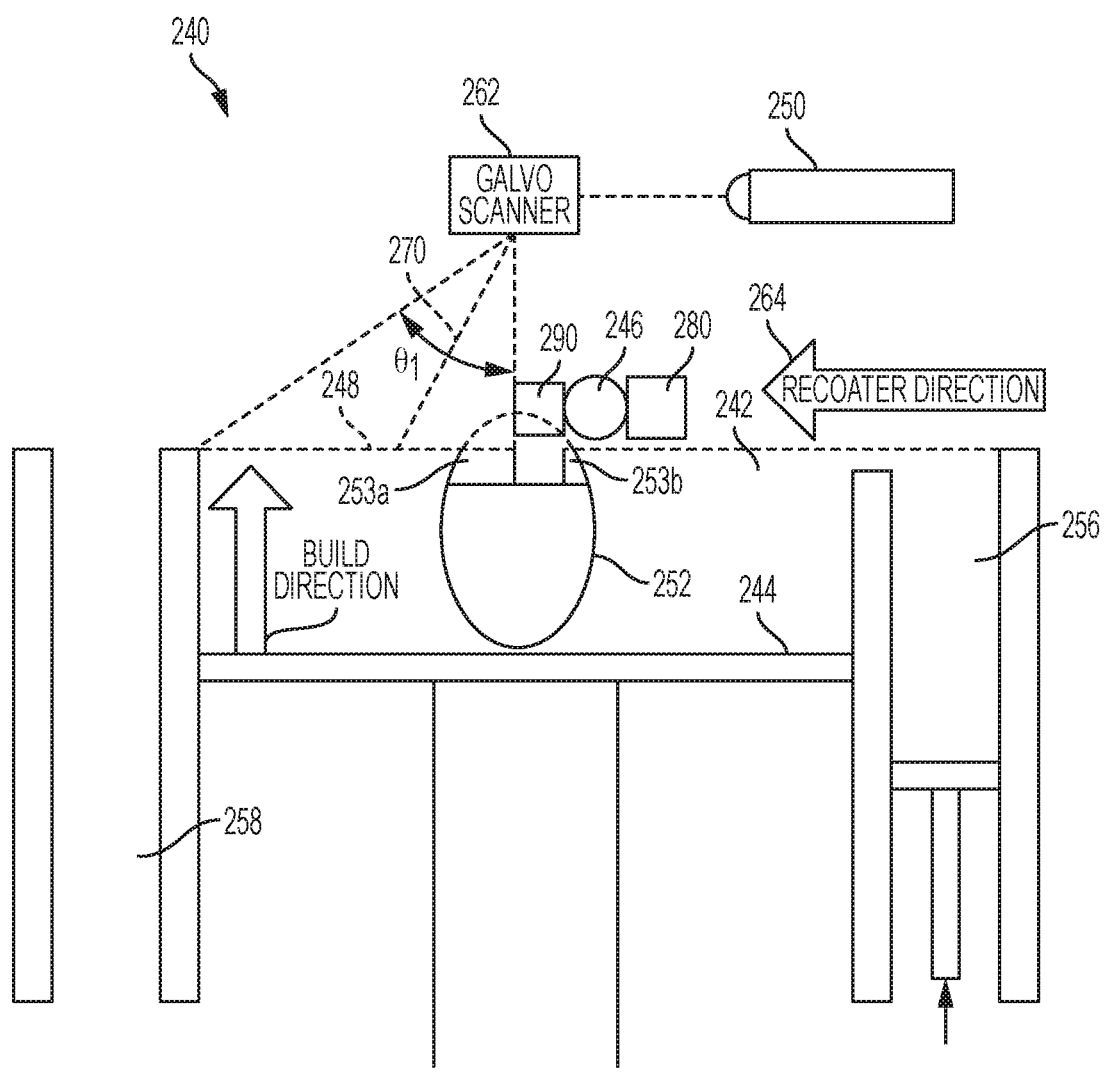
FIG. 2B shows a schematic diagram of an exposed portion of solidified build material during AM according to a first embodiment of the present disclosure.
Figure 5B:
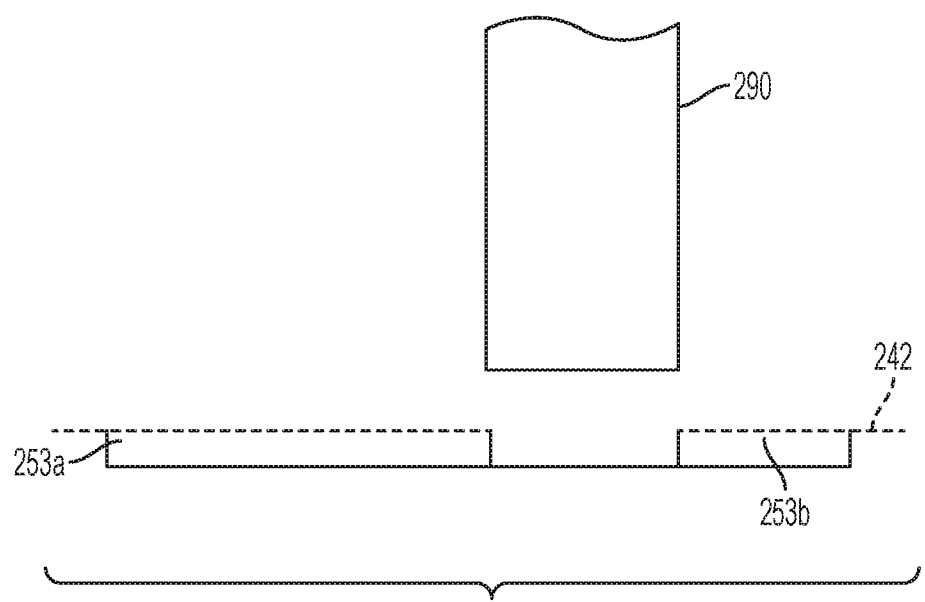
FIG. 5B shows a close-up view of a schematic of the build surface with an exposed portion of solidified build material during AM according to some embodiments of the present disclosure.

Vacuum unit 290 thus exposes a portion of the fused region through the subsequent layer 253 of first build material (FIG. 2B). FIG. 5B shows a close-up view of the exposed portion of the fused region at the build surface. In some aspects, the exposed portion of the fused region is bordered by portions 253a, 253b of the subsequent layer 253.

Figure 2C:
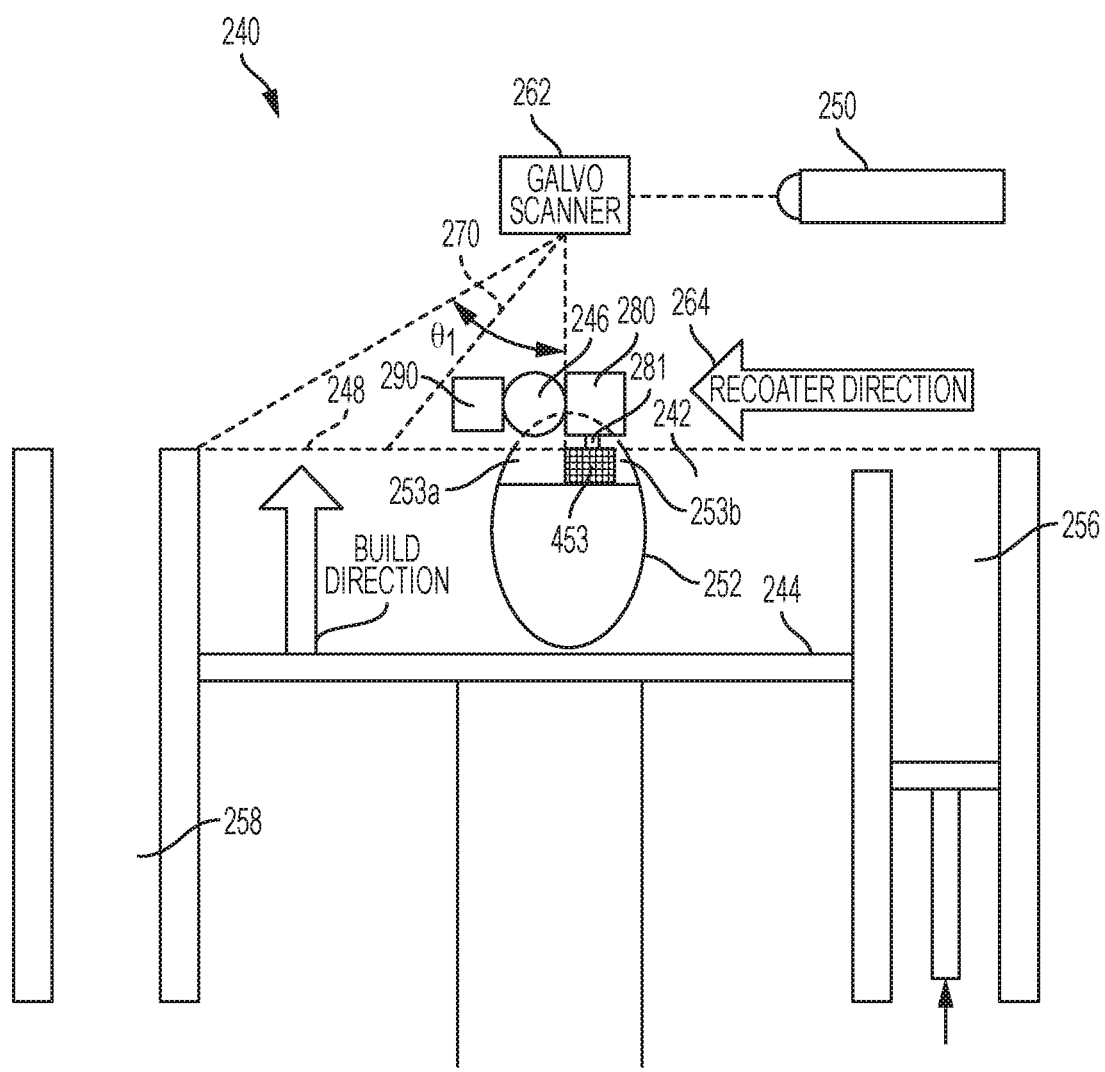
FIG. 2C shows a schematic diagram of a step of depositing on an exposed portion of solidified build material during AM according to a first embodiment of the present disclosure.
Figure 5C:
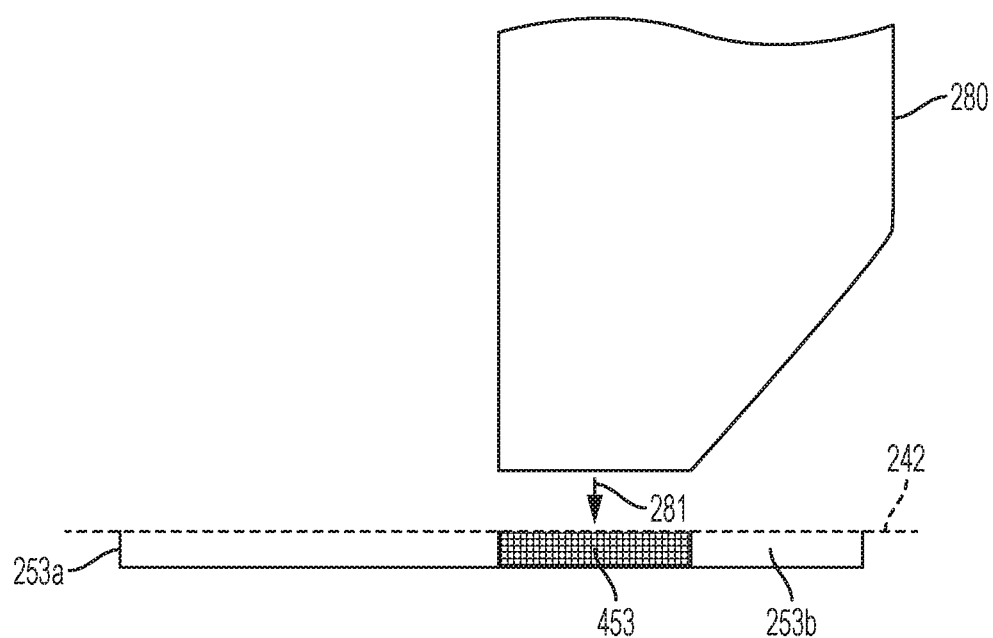
FIG. 5C shows a close-up view of a schematic of depositing on an exposed portion of solidified build material during AM according to some embodiments of the present disclosure.

Dispenser unit 280 deposits along path 281 a deposit 453 over at least a portion of the exposed fused region of the most recently solidified or fused layer of object 252 (see FIG. 2C). FIG. 5C shows a close-up view of the build surface at this step. In some aspects, the deposit 453 is a second build material. In some aspects, the deposit is an insert. Alternatively, dispenser unit 280 may deposit along path 281 a deposit 453 that is a second build material over at least a portion of first build material prior to being solidified or fused using a mechanism for selectively fusing or solidifying at least a portion of the layer of powder. The mechanism may be an energy beam from an energy source, which may be but is not limited to a laser source or an electron beam source. In an alternate embodiment, the mechanism for selectively fusing may be binder jetting.

Dispenser unit 280 deposits a second build material 453 or an insert 453 onto at least a portion of one or more solidified regions of a recently solidified or fused layer of a first build material or, alternatively, over at least a portion of the first build material prior to being fused or solidified by an energy beam. The dispenser unit 280 may be used to deposit any second build material or any insert suitable for use in conjunction with apparatus 240 and the first build material. The insert may be an item such as, but not limited to, a bushing, a threaded insert, or an identifying marker. In some aspects, the insert may be welded in place. In some aspects, the insert is a pre-fused portion of a second build material. Suitable build materials include, but are not limited to, powdered polymers and metals such as cobalt chrome, stainless steels, tooling steel, maraging steel, aluminum alloys, nickel alloys, copper alloys, and titanium alloys. Selection of the second build material or insert will depend on the choice of the first build material. In some aspects, the second build material or insert is not the same as the first build material. In some aspects, after depositing the second build material, the recoater arm is moved, to level the deposited second build material.

The method and apparatus of the present disclosure involve localized, site-specific deposition of a second build material or an insert, which offers advantages over the art. For example, the method and apparatus of the present disclosure may facilitate the anti-counterfeiting operations, integrated part coating, and production of graded material composition parts.

In some aspects, the dispenser unit 280 may be used to deposit a second build material 453 or insert 453 with desirable properties, such as for tagging, identification, or anti-counterfeiting purposes and related detection methods, or to impart desirable material properties to the manufactured object. In some aspects, the second build material or insert may be more opaque to x-ray radiation than the first build material. In some aspects, the second build material or insert may be more opaque to radioactivity than the first build material. In some aspects, the second build material or insert may be a radioactive emitter to enable tagging of the parts.

Preferably, the second build material 453 differs from the first build material in one or more physicochemical properties, a non-exhaustive list of examples of which is provided in the following discussion. In some aspects, the second build material 453 may have a different density than the first build material in the solidified state. In some aspects, the second build material 453 may have a different absorbance energy than the first build material in the solidified state as measured by computed tomography (CT) scanning. In some aspects, the second build material 453 has different mechanical wear properties than the first build material. In some aspects, the second build material 453 has greater corrosion resistance than the first build material. Additionally, compared to the first build material, the second build material 453 or insert 453 may differ of at least one of electromagnetic absorptivity or reflectivity, such as infra-red (IR) absorptivity or reflectivity or ultra-violet (UV) absorptivity or reflectivity; emission, such as IR emissivity, secondary x-ray emission energy profile, neutron scattering profile, or surface properties; electrical properties, such as surface energy, surface properties, or electrical conductivity; friction, such as coefficient of friction; thermal properties, such as thermal conductivity or surface properties; acoustic properties, such as acoustic propagation properties; mechanical strength, such as fatigue resistance or surface properties; wear, such as wear resistance or surface properties; and tribology, such as surface properties. In some aspects, the second material has different electrical conductivity than the first build material.

In some aspects, the second build material or insert is a contrast agent. The selection of a suitable contrast agent will depend on the particular application and on the build material or first build material. Suitable contrast agents include those that are non-reactive with any metals contained within build materials (e.g., aluminum, cobalt, nickel) and those that are not themselves contained within the first build material of use. Materials known to be contrast agents in certain circumstances include, but are not limited to, high-atomic numbered metals (e.g., tungsten, osmium). For example, tungsten or osmium may be suitable x-ray CT contrast agents for aluminum or cobalt- or nickel-based superalloys. As another example, if the first build material is cobalt chrome, a suitable contrast agent may be any other metal or non-metal.

In some aspects, the second material 453 is deposited in a single layer. In some aspects, the second material is deposited over multiple layers, to obtain a 3D contrast image.

Figure 2D:
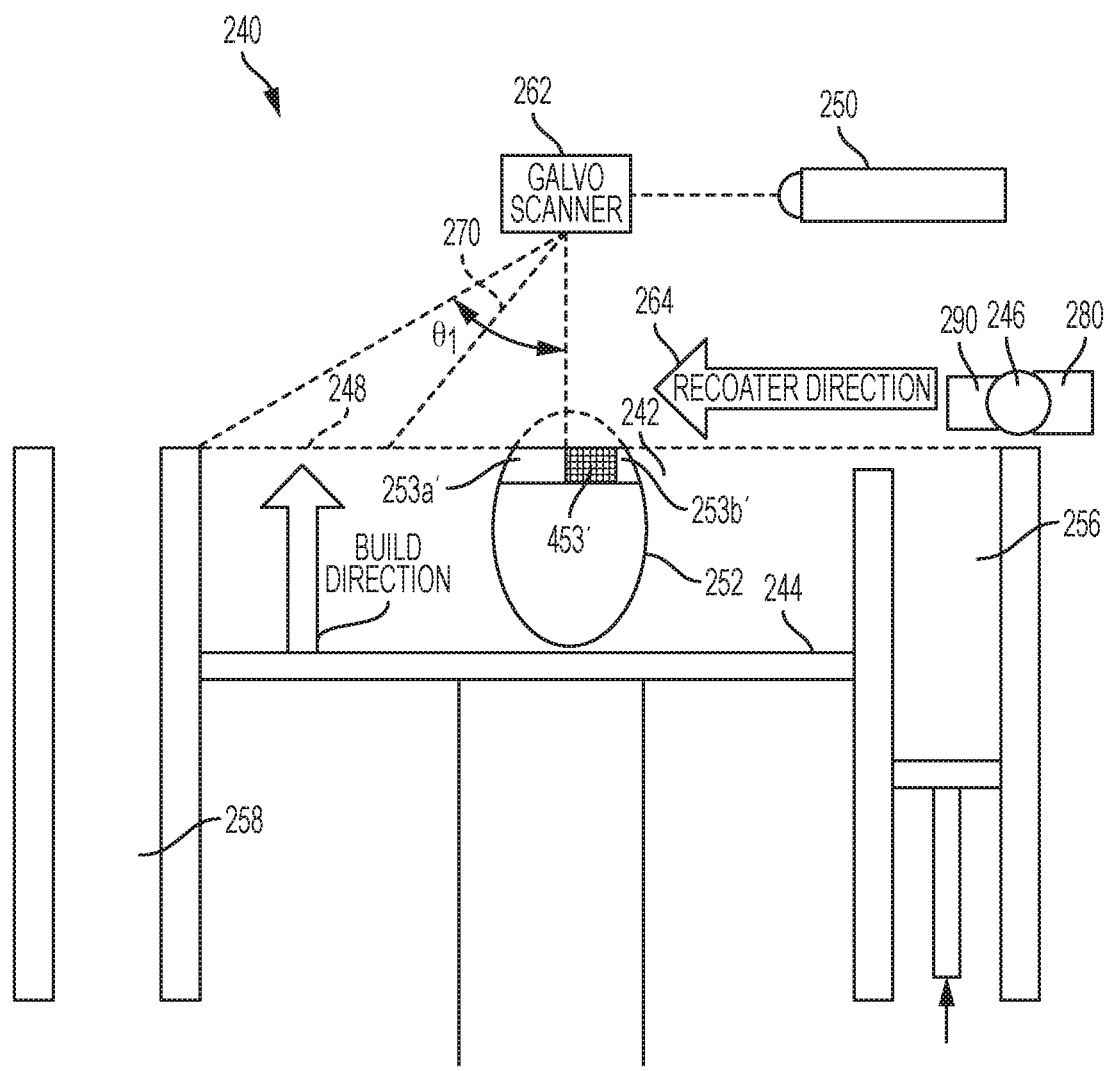
FIG. 2D shows a schematic diagram of irradiating at least a portion of a given layer of build material after deposition of a second build material or an insert, according to a first embodiment of the present disclosure.
Figure 2E:
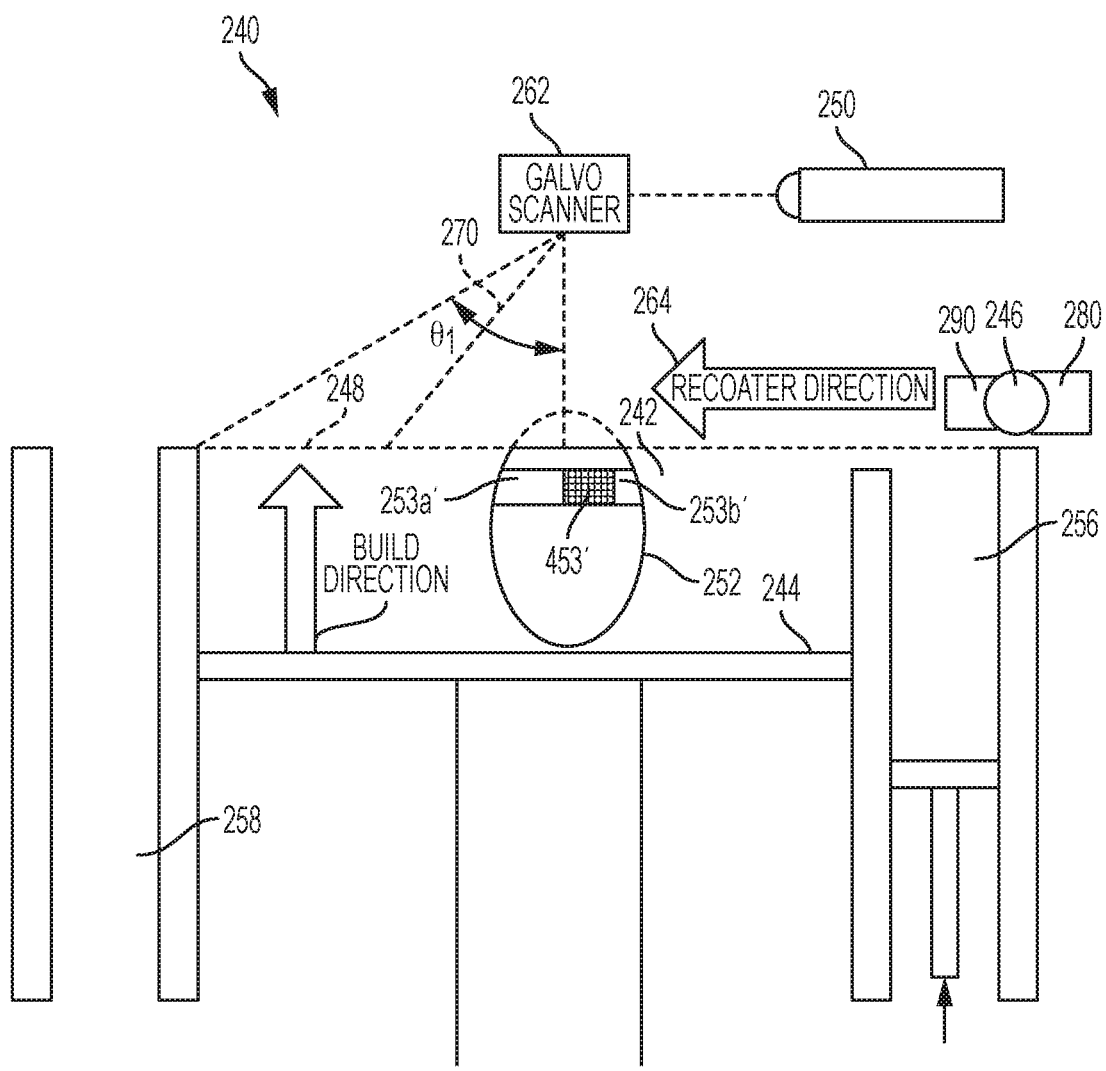
FIG. 2E shows a schematic diagram of applying a layer of build material over the solidified layer formed as shown in FIG. 2D, according to a first embodiment of the present disclosure.

After the second build material 453 or insert 453 has been deposited and optionally leveled, energy beam 270 sinters or melts portions 253a, 253b of the subsequent layer 253 and deposit 453 (if a second build material), under the control of an irradiation emission directing device, such as galvo scanner 262, forming solidified portions 253a', 253b' of the subsequent layer 253 and, if applicable, solidified region 453' of the second build material 453 (FIG. 2D). Build plate 244 may then be lowered, and recoater arm 246 may evenly spread a subsequent layer of build material over powder bed 242 and the most recently solidified layer of object 252 (253a', 253b', and 453'; FIG. 2E). In some aspects, the subsequent layer of build material is spread over the deposited second build material 453 or insert 453, and the deposited second build material 453 (if deposit 453 is a second build material) is solidified (to 453') before the subsequent layer of build material is spread over it. In some aspects, no subsequent layer of build material is spread over the solidified deposited second build material 453' or insert 453'. In some aspects, second build material 453 or insert 453 is deposited over at least a portion of powder material prior to being fused or solidified by an energy beam, and the deposited second build material 453 and the first build material in layer 253 are fused or solidified by an energy beam. In some aspects, a subsequent layer of build material may be spread over the fused or solidified layer and the solidified deposited second build material 453'.

The energy source may emit radiation at any wavelength suitable for use in additive printing methods, as will be known to those of skill in the art. In some aspects, the energy source may be a laser for producing a laser beam. In some aspects, the energy source may be an electron beam source, such as a filament that emits electrons when a current flows through it.

The energy beam 270 sinters or melts a cross-sectional layer of the object 252 being built under control of an irradiation emission directing device, such as a galvo scanner 262 (see FIG. 2D). The galvo scanner 262 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 1000 millimeters per second. The build platform 244 is lowered and another layer of powder is spread over the powder bed and object being built (FIG. 2E), followed by successive melting/sintering of the powder by the laser 250. The powder layer is typically, for example, 10 to 100 microns in thickness. The process is repeated until the object 252 is completely built up from the melted/sintered powder material. The laser 250 may be controlled by a computer system (not shown) including a processor and a memory. The computer system may determine a scan pattern for each layer and control laser 250 to irradiate the powder material according to the scan pattern. After fabrication of the object 252 is complete, various post-processing procedures may be applied to the object 252. Post processing procedures include removal of excess powder by, for example, blowing or vacuuming. Other post processing procedures include a stress release process. Additionally, thermal and chemical post processing procedures can be used to finish the object 252.

As shown in FIGS. 2A-2E, the dispenser unit 280 and vacuum unit 290 may be advantageously attached to the recoater mechanism (e.g. recoater arm 246) to allow two- or three-dimensional movement of the dispenser unit 280 and vacuum unit 290 around the build environment. FIG. 2F shows an example of a vacuum unit 290 and a dispenser unit 280 attached to a recoater arm 246. The normal motion of the recoater arm 246 enables positioning in one dimension (the direction indicated by the arrow "Y"). Utilizing the recoater arm as a rail in conjunction with a mechanism to enable motion along the rail allows motion in a second dimension (the direction indicated by the arrow "X"). In one embodiment, this mechanism to enable motion is a linear gear and motor. In a further embodiment, this mechanism is a motor mounted to the recoater arm 246 in conjunction with a drive belt attached to the vacuum unit 290 and/or to the dispenser unit 280. In a further embodiment, the mechanism of motion is a slot-electric motor or a mag-lev drive. The motion of the build surface allows motion in a third dimension (the direction indicated by the arrow "Z").

A key aspect of the invention is the need for the second build material 453 or the insert 453 to be somehow contained and/or deposited close to the build surface. This is because, if the second build material 453 or the insert 453 is not confined or released sufficiently close to the build surface, it would be difficult or even impossible to control where the second build material 453 or the insert 453 is deposited. It is necessary that the second build material 453 or the insert 453 is deposited from a height of no more than 2 cm away from the build surface in order to be sufficiently close, preferably 0.1-2 cm. For this reason, it may be advantageous that the recoater arm 246 is operable to further move and position the dispenser 760 in a vertical direction (e.g., as indicated by the arrow "Z" in FIG. 2F). Additionally, in certain embodiments, the recoater arm 246 may be operable to move and position the dispenser unit 280 in direction 264 (FIGS. 2A-2E) or the direction indicated by the arrow "Y" in FIG. 2F. Additionally, movement along the length of the recoater arm 246 itself (e.g. as indicated by the arrow 'X' in FIG. 2F) allows movement and positioning in a second direction. Importantly, the proximity of the dispenser unit 280 on recoater arm 246 to the powder bed 242 ensures that the dispenser unit 280 is sufficiently close to the powder bed 242 and the build surface. Movement along the length of the recoater arm 246 may be facilitated using a drive motor and a linear gear mechanism, a drive motor and drive belt, slot-electric motor drive, or a mag-lev (magnetic levitation) drive.

FIG. 2F shows a close-up view of vacuum unit 290 according to some aspects of the present disclosure. In some aspects, the recoater arm 246 comprises a recoater blade 710. In some aspects, vacuum unit 290 comprises vacuum line connection 620, a valve/actuator 630, and a vacuum nozzle 660. Powder removed by vacuum unit 290 travels along path 291 into vacuum nozzle 660, through the valve/actuator 630, and out vacuum line connection 620, through tube 661, to a vacuum source, optionally further comprising a trap, thereby exposing a portion of the solidified region of object 252 through subsequent layer 253 of build material, the exposed portion being bordered by portions 253a, 253b of subsequent layer 253 (see FIGS. 2A-2C).

FIG. 2F shows a close-up view of dispenser unit 280 according to some aspects of the present disclosure. In some aspects, the recoater arm 246 may comprise a recoater blade 710. In some aspects, dispenser unit 280 comprises a dispenser 760 and a valve/actuator 730. The dispenser may hold and dispense a second build material (e.g., a second metal powder) or an insert. The second build material or insert is placed, via path 281 and actuator 730, out the dispenser unit 280, and onto at least a portion of the exposed fused or solidified region of the most recently solidified or fused layer of build material in the manufacture of object 252, or onto at least a portion of one or more unfused or unsolidified powder regions in a powder layer 253 of build material in the manufacture of object 252.

FIG. 2F shows the enclosure 665 which serves not only as a frame to hold the vacuum nozzle 660, valve/actuator 630, and vacuum line connection 620, but to also confine the vacuum. The vacuum nozzle 660 extending below the actuator 630 and downward (i.e. away from the vacuum line connection 620 and toward the build surface) ensures that the vacuum is applied close to the build surface. The small gap existing between the bottom of the enclosure 665, or the vacuum nozzle 660, and the build surface allows clearance for motion. For this reason, it may be advantageous that the recoater arm 246 is operable to further move and position the vacuum unit 290 in a vertical direction (e.g. as indicated by the arrow "Z" in FIG. 2F). In some aspects, enclosure 665 is operable to further move and position vacuum unit 290 in a vertical direction (e.g., as indicated by the arrow "Z" in FIG. 2F).

FIG. 2F shows the housing 732 which serves not only as a frame to hold the dispenser 760 and the actuator 730, but also to position the placement of the second build material 453 or the insert 453. The dispenser 760 extending downward toward actuator 730 ensures that the second build material 453 or the insert 453 is applied close to or placed on the build surface. The small gap existing between the bottom of the dispenser 760 and the build surface allows clearance allowing movement of the recoater blade 710. For this reason, it may be advantageous that the recoater arm 246 is operable to further move and position the dispenser 760 in a third direction (e.g., as indicated by the arrow "Z" in FIG. 2F). In some aspects, housing 732 is operable to further move and position dispenser unit 280 in a vertical direction (e.g., as indicated by the arrow "Z" in FIG. 2F).

Figure 3A:
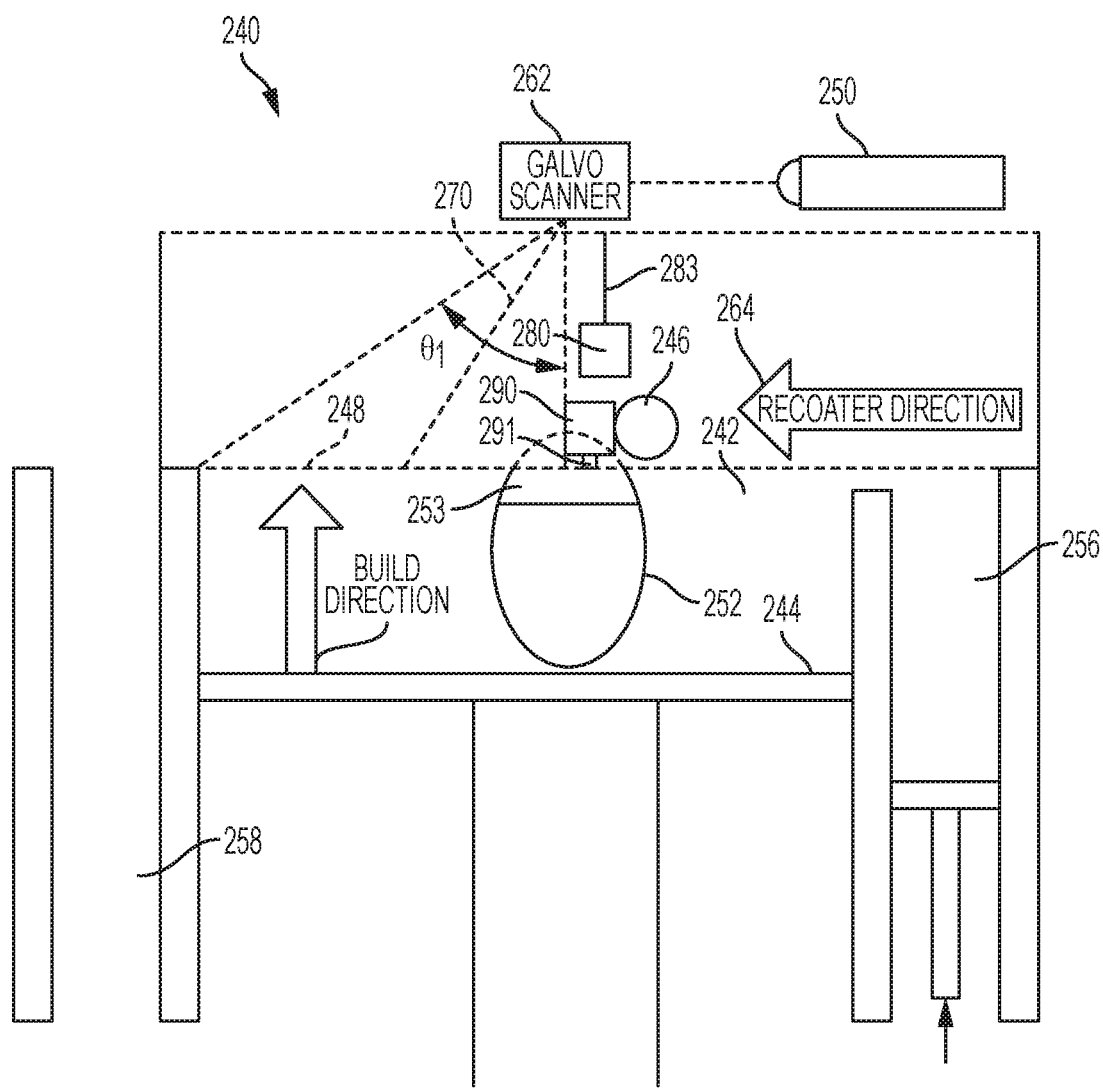
FIG. 3A shows a schematic diagram of vacuum removal of build material during AM according to a second embodiment of the present disclosure.

According to a second embodiment, apparatus 240 may be equipped with a dispenser unit 280. In a second embodiment, dispenser unit 280 may be attached to positioning unit, such as positioning unit 283 (FIG. 3A). In a second embodiment, apparatus 240 may be equipped with a powder removal unit, such as vacuum unit 290. In a second embodiment, dispenser unit 280 may be attached to positioning unit 283, and vacuum unit 290 may be attached to a mechanism for providing a layer of powder, such as a recoater mechanism, such as recoater arm 246 (FIG. 3A). The positioning unit is shown in further detail in FIG. 3F, and the recoater arm 246 is shown in further detail in FIG. 3G. The powder bed apparatus shown in FIG. 3A may have identical features to that shown in FIG. 2A.

After the formation of at least one fused or solidified region of a build material into a component layer, during the manufacture of an object 252, and subsequent deposition of a subsequent layer 253 of first build material, vacuum unit 290 removes by vacuum a portion of the subsequent layer 253 of the first build material, along path 291 (FIG. 3A). FIG. 5A shows a close-up view of the build surface at this step.

Figure 3B:
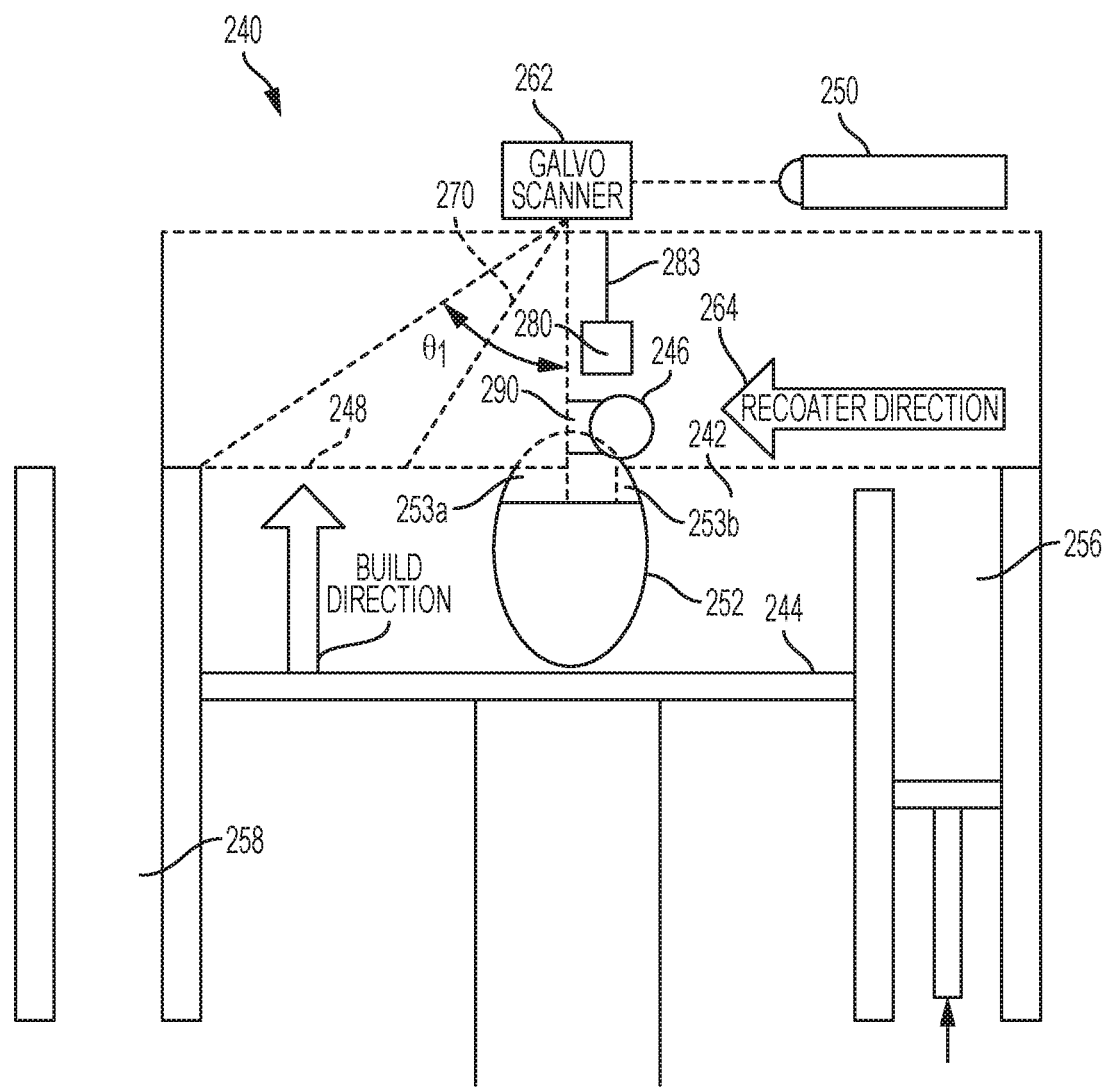
FIG. 3B shows a schematic diagram of an exposed portion of solidified build material during AM according to a second embodiment of the present disclosure.

Vacuum unit 290 thus exposes a portion of the fused or solidified region through the subsequent layer 253 of first build material (FIG. 3B). FIG. 5B shows a close-up view of the exposed portion of the fused or solidified region at the build surface. In some aspects, the exposed portion of the solidified region is bordered by portions 253a, 253b of the subsequent layer 253.

Figure 3C:
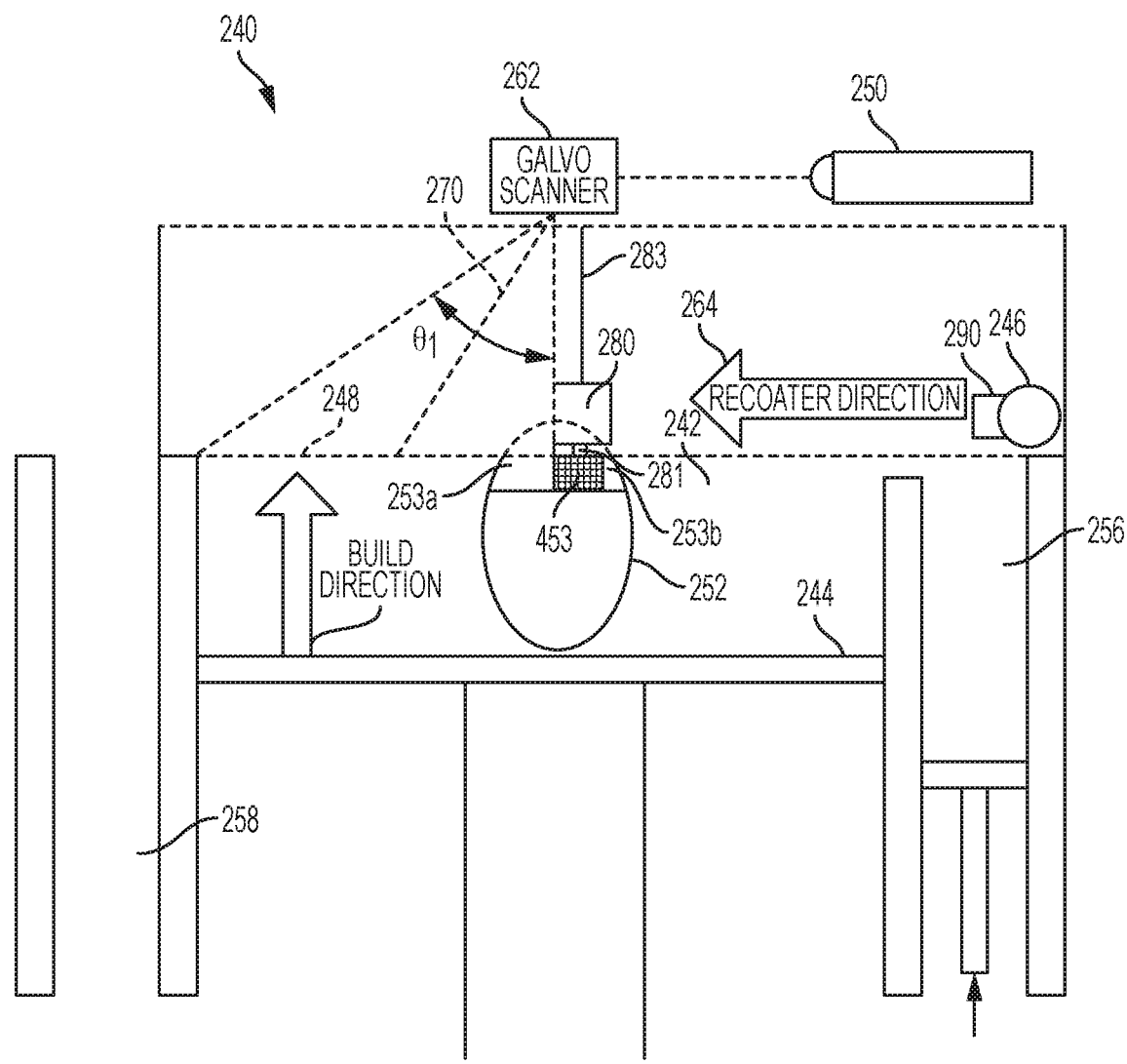
FIG. 3C shows a schematic diagram of a step of depositing on an exposed portion of solidified build material by a dispenser unit attached to a separate positioning unit, according to a second embodiment of the present disclosure.

Dispenser unit 280 deposits along path 281 a deposit 453 over at least a portion of the exposed fused or solidified region of the most recently solidified or fused layer of object 252 (see FIG. 3C). FIG. 5C shows a close-up view of the build surface at this step. In some aspects, the deposit 453 is a second build material. In some aspects, the deposit is an insert. Alternatively, dispenser unit 280 may deposit along path 281 a deposit 453 that is a second build material over at least a portion of first build material prior to being solidified or fused using a mechanism for selectively fusing or solidifying at least a portion of the layer of powder. The mechanism may be an energy beam from an energy source, which may be but is not limited to a laser source or an electron beam source. In an alternate embodiment, the mechanism for selectively fusing may be binder jetting.

Dispenser unit 280 deposits a second build material 453 or an insert 453 onto at least a portion of one or more solidified regions of a recently solidified or fused layer of a first build material or, alternatively, over at least a portion of first build material prior to being fused or solidified by an energy beam. The dispenser unit 280 may be used to deposit any second build material or any insert suitable for use in conjunction with apparatus 240 and the build material. The insert may be an item such as, but not limited to, a bushing, a threaded insert, or an identifying marker. In some aspects, the insert may be welded in place. In some aspects, the insert is a pre-fused portion of a second build material. Suitable build materials include, but are not limited to, powdered polymers and metals such as cobalt chrome, stainless steels, tooling steel, maraging steel, aluminum alloys, nickel alloys, copper alloys, and titanium alloys. Selection of the second build material or insert will depend on the choice of the first build material. In some aspects, the second build material or insert is not the same as the first build material.

The method and apparatus of the present disclosure involve localized, site-specific deposition of a second build material or an insert, which offers advantages over the art. For example, the method and apparatus of the present disclosure may facilitate the anti-counterfeiting operations, integrated part coating, and production of graded material composition parts.

In some aspects, the dispenser unit 280 may be used to deposit a second build material 453 or insert 453 with desirable properties, such as for tagging, identification, or anti-counterfeiting purposes and related detection methods, or to impart desirable material properties to the manufactured object. In some aspects, the second build material or insert may be more opaque to x-ray radiation than the first build material. In some aspects, the second build material or insert may be more opaque to radioactivity than the first build material. In some aspects, the second build material or insert may be a radioactive emitter to enable tagging of the parts.

Preferably, the second build material 453 differs from the first build material in one or more physicochemical properties, a non-exhaustive list of examples of which is provided in the following discussion. In some aspects, the second build material 453 may have a different density than the first build material in the solidified state. In some aspects, the second build material 453 may have a different absorbance energy than the first build material in the solidified state as measured by computed tomography (CT) scanning. In some aspects, the second build material 453 has different mechanical wear properties than the first build material. In some aspects, the second build material 453 has greater corrosion resistance than the first build material. Additionally, compared to the first build material, the second build material 453 or insert 453 may differ of at least one of infra-red (IR) emissivity, IR absorptivity or reflectivity, ultra-violet (UV) absorptivity or reflectivity, secondary x-ray emission energy profile, neutron scattering profile, surface energy, coefficient of friction, thermal conductivity, electrical conductivity, acoustic propagation properties, fatigue resistance, wear resistance, tribology, surface properties. In some aspects, the second material has different electrical conductivity than the first build material.

In some aspects, the second build material or insert is a contrast agent. The selection of a suitable contrast agent will depend on the particular application and on the build material or first build material. Suitable contrast agents include those that are non-reactive with any metals contained within build materials (e.g., aluminum, cobalt, nickel) and those that are not themselves contained within the first build material of use. Materials known to be contrast agents in certain circumstances include, but are not limited to, high-atomic numbered metals (e.g., tungsten, osmium). For example, tungsten or osmium may be suitable x-ray CT contrast agents for aluminum or cobalt- or nickel-based superalloys. As another example, if the first build material is cobalt chrome, a suitable contrast agent may be any other metal or non-metal.

In some aspects, the second material 453 is deposited in a single layer. In some aspects, the second material is deposited over multiple layers, to obtain a 3D contrast image.

Figure 3D:
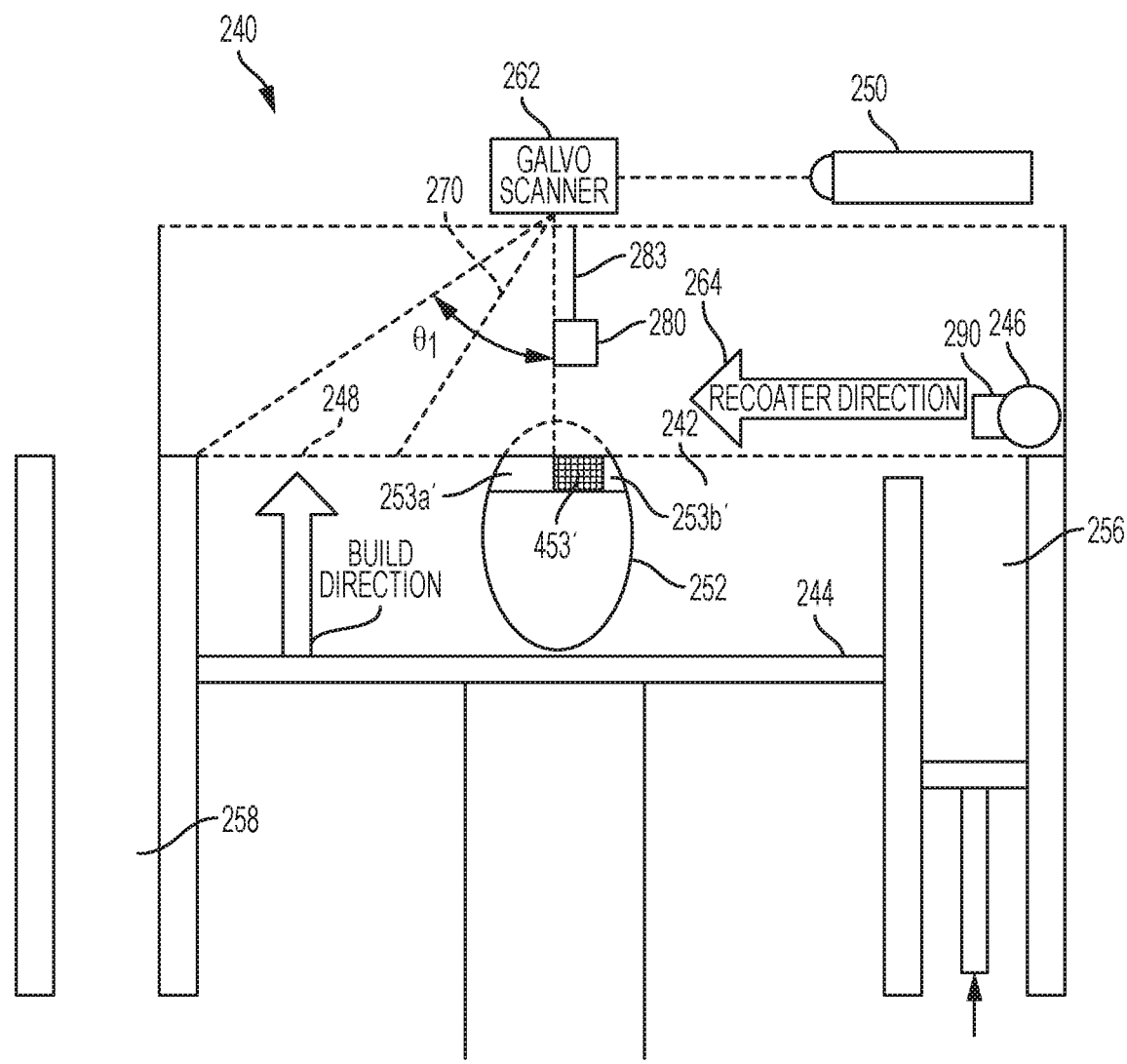
FIG. 3D shows a schematic diagram of irradiating at least a portion of a given layer of build material after deposition of a second build material or an insert by a separate positioning unit, according to a second embodiment of the present disclosure.
Figure 3E:
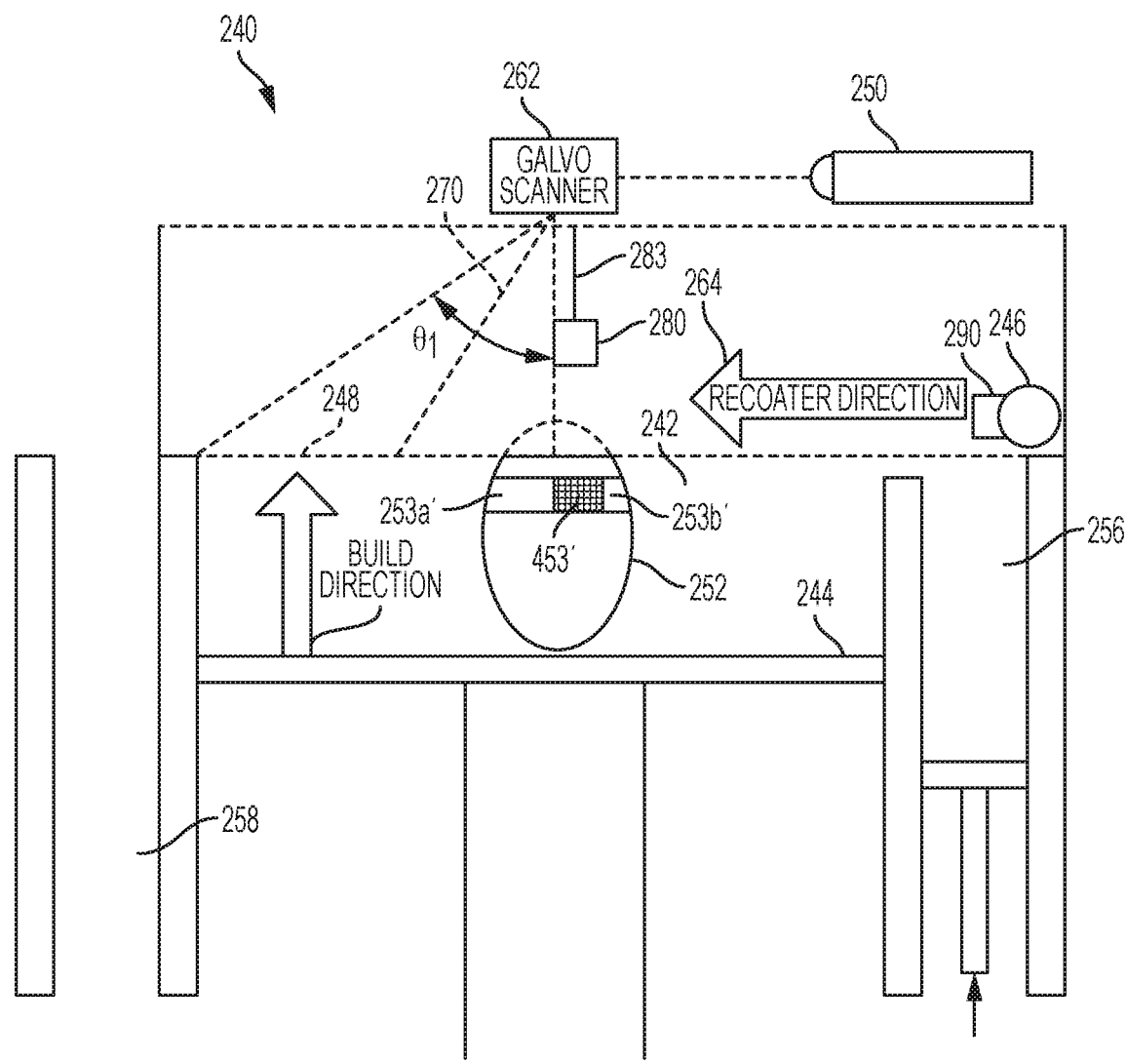
FIG. 3E shows a schematic diagram of applying a layer of build material over the solidified layer formed as shown in FIG. 3D, according to a second embodiment of the present disclosure.

After the second build material 453 or insert 453 has been deposited, energy beam 270 sinters or melts portions 253*a*, 253*b* of the subsequent layer 253 and deposit 453 (if a second build material), under the control of an irradiation emission directing device, such as galvo scanner 262, forming solidified portions 253*a'*, 253*b'* of the subsequent layer 253 and, if applicable, solidified region 453' of the second build material 453 (FIG. 3D). Build plate 244 may then be lowered, and recoater arm 246 may evenly spread a subsequent layer of build material over powder bed 242 and the most recently solidified layer of object 252 (253*a'*, 253*b'*, and 453'; FIG. 3E). In some aspects, the subsequent layer of build material is spread over the deposited second build material 453 or insert 453, and the deposited second build material 453 (if deposit 453 is a second build material) is solidified (to 453') before the subsequent layer of build material is spread over it. In some aspects, no subsequent layer of build material is spread over the solidified deposited second build material 453' or insert 453'. In some aspects, second build material 453 or insert 453 is deposited over at least a portion of powder material prior to being fused or solidified by an energy beam, and the deposited second build material 453 and the first build material in layer 253 are fused or solidified by an energy beam. In some aspects, a subsequent layer of build material may be spread over the fused or solidified layer and the solidified deposited second build material 453'.

The energy source may emit radiation at any wavelength suitable for use in additive printing methods, as will be known to those of skill in the art. In some aspects, the energy source may be a laser for producing a laser beam. In some aspects, the energy source may be an electron beam source, such as a filament that emits electrons when a current flows through it.

The energy beam 270 sinters or melts a cross-sectional layer of the object 252 being built under control of an irradiation emission directing device, such as a galvo scanner 262 (see FIG. 3D). The galvo scanner 262 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 1000 millimeters per second. The build platform 244 is lowered and another layer of powder is spread over the powder bed and object being built (FIG. 3E), followed by successive melting/sintering of the powder by the laser 250. The powder layer is typically, for example, 10 to 100 microns in thickness. The process is repeated until the object 252 is completely built up from the melted/sintered powder material. The laser 250 may be controlled by a computer system (not shown) including a processor and a memory. The computer system may determine a scan pattern for each layer and control laser 250 to irradiate the powder material according to the scan pattern.

After fabrication of the object 252 is complete, various post-processing procedures may be applied to the object 252. Post processing procedures include removal of excess powder by, for example, blowing or vacuuming. Other post processing procedures include a stress release process. Additionally, thermal and chemical post processing procedures can be used to finish the object 252.

Figure 3F:
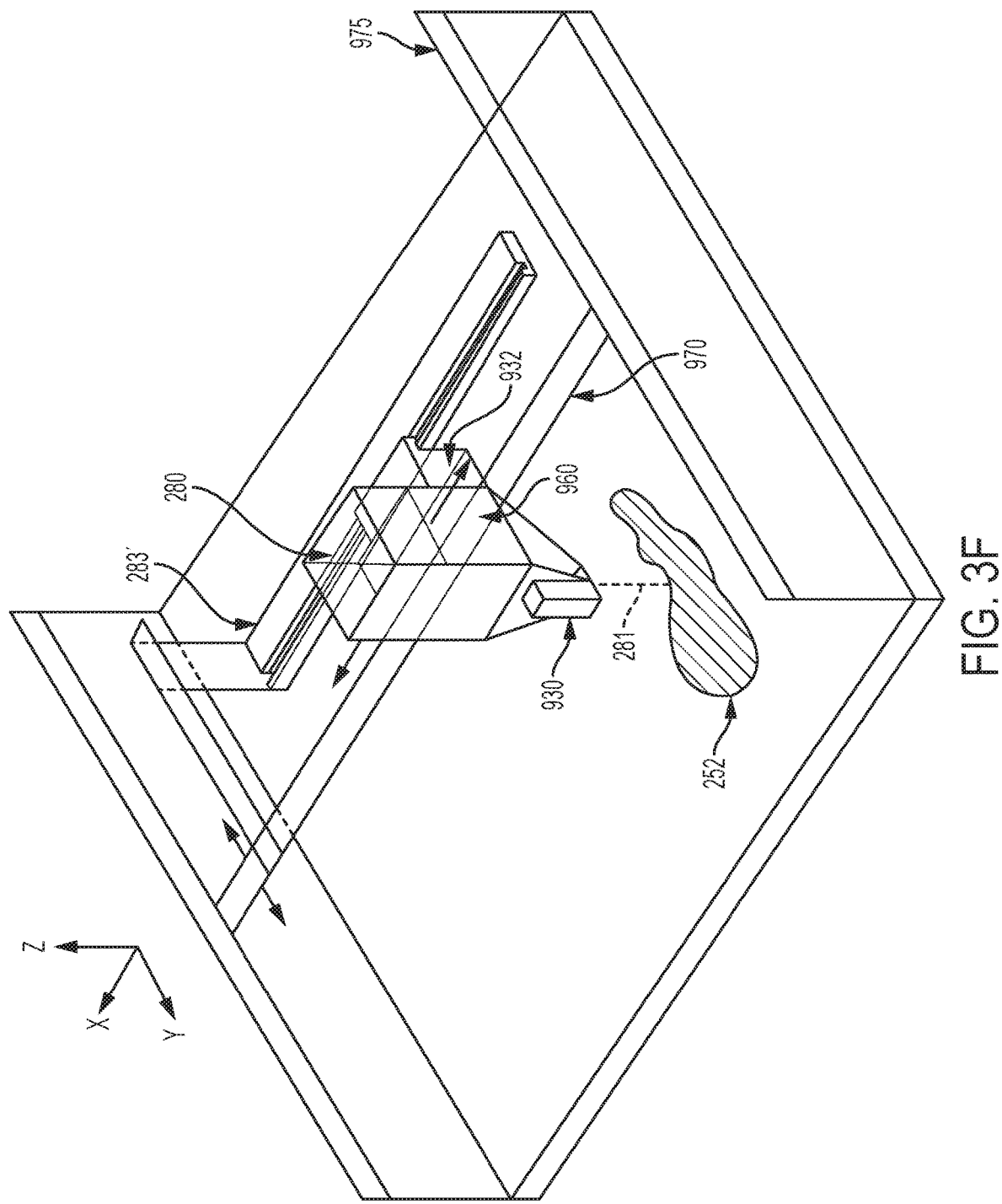
FIG. 3F shows an example of a dispenser unit attached to a positioning system according to a second embodiment of the present disclosure.
Figure 3G:
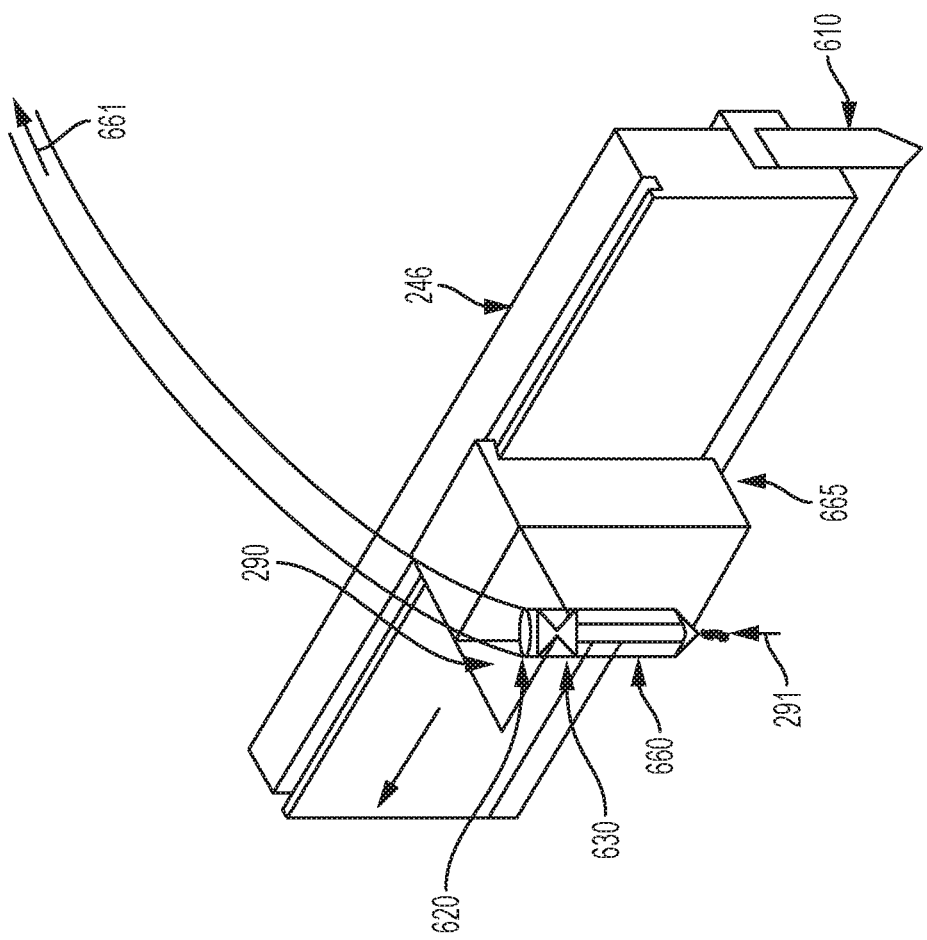
FIG. 3G shows an example of a vacuum unit attached to a recoater arm according to a second embodiment of the present disclosure.
Figure 3G:
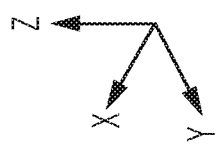

As shown in FIGS. 3A-3E, the dispenser unit 280 may be advantageously attached to a positioning unit 283, and vacuum unit 290 may be advantageously attached to the recoater mechanism (e.g., recoater arm 246), to allow two- or three-dimensional movement of the dispenser unit 280 and vacuum unit 290 around the build environment. FIG. 3F shows an example of a dispenser unit 280 attached to a positioning unit 283, and FIG. 3G shows an example of a vacuum unit 290 attached to a recoater arm 246. The normal motion of the recoater arm 246 enables positioning in one dimension (the direction indicated by the arrow "Y" in FIG. 3G). Utilizing the recoater arm as a rail in conjunction with a mechanism to enable motion along the rail allows motion in a second dimension (the direction indicated by the arrow "X" in FIG. 3G). In one embodiment, this mechanism to enable motion is a linear gear and motor. In a further embodiment, this mechanism is a motor mounted to the recoater arm 246 in conjunction with a drive belt attached to the vacuum unit 290. In a further embodiment, the mechanism of motion is a slot-electric motor or a mag-lev drive. The motion of the build surface allows motion in a third dimension (the direction indicated by the arrow "Z" in FIG. 3G).

The positioning unit may be a motorized robotic arm, e.g. robotic arm 283 of FIG. 3F, separate from the recoater arm 246, and positioning unit 283 is preferably computer-controlled. In an alternative embodiment, the positioning unit 283 may be a gantry, e.g. a X-Y-Z gantry, whereby a plurality of rails or crossbeams, drive belts, drive screws and/or a Cartesian gantry may be utilized to position the dispenser unit 280 close to the powder bed 242. In yet further alternative embodiments, the positioning unit 283 may be a delta robot, a cable robot, a belt drive, or the like.

Motion of dispenser unit 280 (FIG. 3F) along rail 970 and/or using positioning unit 283 as a rail allows movement and positioning of dispenser unit 280 in one dimension (the direction indicated by the arrow "X"); motion of rail 970 along sidewalls 975 allows movement and positioning of dispenser unit 280 in a second dimension (the direction indicated by the arrow "Y"); and motion of the build surface allows movement and positioning of dispenser unit 280 in a third dimension (the direction indicated by the arrow "Z").

A key aspect of the invention is the need for the second build material 453 or the insert 453 to be somehow contained and/or deposited close to the build surface. This is because, if the second build material 453 or the insert 453 is not confined or released sufficiently close to the build surface, it would be difficult or even impossible to control where the second build material 453 or the insert 453 is deposited. It is necessary that the second build material 453 or the insert 453 is deposited from a height of no more than 2 cm away from the build surface in order to be sufficiently close, preferably 0.1-2 cm. For this reason, it may be advantageous that the positioning unit 283 in FIG. 3F is operable to further move and position the dispenser 960 in a vertical direction (e.g., as indicated by the arrow "Z" in FIG. 3F). Additionally, in certain embodiments, the positioning unit 283 may be operable to move and position the dispenser unit 280 in direction 264 (FIGS. 3A-3E) or the direction indicated by the arrow "Y" in FIG. 3F. Additionally, movement along the length of the positioning unit 283 itself allows movement and positioning in a second direction (e.g. as indicated by the arrow "X" in FIG. 3F). Importantly, the proximity of the dispenser unit 280 on positioning unit 283 to the powder bed 242 ensures that the dispenser unit 280 is sufficiently close to the powder bed 242 and the build surface. Movement along the length of the positioning unit 283 may be facilitated using a drive motor and a linear gear mechanism, a drive motor and drive belt, slot-electric motor drive, or a mag-lev (magnetic levitation) drive.

FIG. 3F shows a close-up view of dispenser unit 280 according to a second embodiment of the present disclosure. The dispenser unit 280 shown in FIG. 3F may have identical features to that shown in FIG. 2F. All aspects described with respect to dispenser unit 280 attached to recoater arm 246 (FIG. 2F) apply with equal force to dispenser unit 280 attached to positioning unit 283 (FIG. 3F). The additional vertical movement provided in this embodiment is useful in systems with lowering build plates (e.g., as shown in FIG. 1), as well as in systems with a stationary build plate, including, but not limited to, those described in:

U.S. patent application Ser. No. 15/406,467, titled "Additive Manufacturing Using a Mobile Build Volume,", and filed Jan. 13, 2017.

U.S. patent application Ser. No. 15/406,454, titled "Additive Manufacturing Using a Mobile Scan Area,", and filed Jan. 13, 2017.

U.S. patent application Ser. No. 15/406,444, titled "Additive Manufacturing Using a Dynamically Grown Build Envelope,", and filed Jan. 13, 2017.

U.S. patent application Ser. No. 15/406,461, titled "Additive Manufacturing Using a Selective Recoater,", and filed Jan. 13, 2017.

U.S. patent application Ser. No. 15/406,471, titled "Large Scale Additive Machine,", and filed Jan. 13, 2017.

The disclosures of these applications are incorporated herein in their entirety to the extent that they disclose additional aspects of additive manufacturing methods and apparatuses that can be used in conjunction with those disclosed herein.

FIG. 3G shows a close-up view of vacuum unit 290 according to some aspects of the present disclosure. In some aspects, the recoater arm 246 comprises a recoater blade 710. In some aspects, vacuum unit 290 comprises vacuum line connection 620, a valve/actuator 630, and a vacuum nozzle 660. Powder removed by vacuum unit 290 travels along path 291 into vacuum nozzle 660, through the valve/actuator 630, and out vacuum line connection 620, through tube 661, to a vacuum source, optionally further comprising a trap, thereby exposing a portion of the solidified region of object 252 through subsequent layer 253 of build material, the exposed portion being bordered by portions 253a, 253b of subsequent layer 253 (see FIGS. 3A-3C). The vacuum unit 290 shown in FIG. 3G may have identical features to that shown in FIG. 2F.

FIG. 3G shows the enclosure 665 which serves not only as a frame to hold the vacuum nozzle 660, valve/actuator 630, and vacuum line connection 620, but to also confine the vacuum. The vacuum nozzle 660 extending below the actuator 630 and downward (i.e., away from the vacuum line connection 620 and toward the build surface) ensures that the vacuum is applied close to the build surface. The small gap existing between the bottom of the enclosure 665, or the vacuum nozzle 660, and the build surface allows clearance for motion. For this reason, it may be advantageous that the recoater arm 246 is operable to further move and position the vacuum unit 290 in a vertical direction (e.g. as indicated by the arrow "Z" in FIG. 3G). In some aspects, enclosure 665 may be operable to further move and position the vacuum unit 290 in a vertical direction (e.g., as indicated by the arrow "Z" in FIG. 3G).

According to a third embodiment of the present disclosure, apparatus 240 may be equipped with a dispenser unit 280. In a third embodiment, a powder removal unit, such as vacuum unit 290, may be attached to a positioning unit, e.g., positioning unit 283 (FIG. 4A), and dispenser unit 280 may be attached to a mechanism for providing a layer of powder, such as a recoater mechanism, such as recoater arm 246 (FIG. 4B). The positioning unit 283 is shown in further detail in FIG. 4A. The powder bed apparatus shown in FIG. 4A may have identical features to that shown in FIG. 2A. Methods of additive manufacturing of an object 252 using the apparatus shown in FIG. 4A, according to a third embodiment, may follow identical steps to methods of additive manufacturing of an object 252 using the apparatuses of FIGS. 2A and 3A, according to first and second embodiments.

After the formation of at least one fused or solidified region of a first build material into a component layer, during the manufacture of an object 252, and subsequent deposition of a subsequent layer 253 of first build material, vacuum unit 290 removes by vacuum a portion of the subsequent layer 253 of the first build material, along path 291 (see, e.g., FIGS. 2A and 3A). FIG. 5A shows a close-up view of this step.

Vacuum unit 290 thus exposes a portion of the fused region through the subsequent layer 253 of first build material (see, e.g., FIGS. 2B and 3B). FIG. 5B shows a close-up view of the exposed portion of the fused or solidified region at the build surface. In some aspects, the exposed portion of the fused or solidified region at the build surface. In some aspects, the exposed portion of the fused or solidified region is bordered by portions 253a, 253b of the subsequent layer 253.

Dispenser unit 280 deposits along path 281 a deposit 453 over at least a portion of the exposed fused or solidified region of the most recently solidified or fused layer of object 252 (see, e.g., FIGS. 2C and 3C). FIG. 5C shows a close-up view of the build surface at this step. In some aspects, the deposit 453 is a second build material. In some aspects, the deposit is an insert. Alternatively, dispenser unit 280 may deposit along path 281 a deposit 453 that is a second build material over at least a portion of first build material prior to being solidified or fused using a mechanism for selectively fusing or solidifying at least a portion of the layer of powder. The mechanism may be an energy beam from an energy source, which may be but is not limited to a laser source or an electron beam source. In an alternate embodiment, the mechanism for selectively fusing may be binder jetting.

Dispenser unit 280 deposits a second build material 453 or an insert 453 onto at least a portion of one or more solidified regions of a recently solidified or fused layer of a first build material or, alternatively, over at least a portion of first build material prior to being fused or solidified by an energy beam. The dispenser unit 280 may be used to deposit any second build material or any insert suitable for use in conjunction with apparatus 240 and the first build material. The insert may be an item such as, but not limited to, a bushing, a threaded insert, or an identifying marker. In some aspects, the insert may be welded in place. In some aspects, the insert is a pre-fused portion of a second build material. Suitable build materials include, but are not limited to, powdered polymers and metals such as cobalt chrome, stainless steels, tooling steel, maraging steel, aluminum alloys, nickel alloys, copper alloys, and titanium alloys. Selection of the second build material or insert will depend on the choice of the first build material. In some aspects, the second build material or insert is not the same as the first build material.

The method and apparatus of the present disclosure involve localized, site-specific deposition of a second build material or an insert, which offers advantages over the art. For example, the method and apparatus of the present disclosure may facilitate the anti-counterfeiting operations, integrated part coating, and production of graded material composition parts.

In some aspects, the dispenser unit 280 may be used to deposit a second build material 453 or insert 453 with desirable properties, such as for tagging, identification, or anti-counterfeiting purposes and related detection methods, or to impart desirable material properties to the manufactured object. In some aspects, the second build material or insert may be more opaque to x-ray radiation than the first build material. In some aspects, the second build material or insert may be more opaque to radioactivity than the first build material. In some aspects, the second build material or insert may be a radioactive emitter, to enable tagging of the parts.

Preferably, the second build material 453 differs from the first build material in one or more physicochemical properties, a non-exhaustive list of examples of which is provided in the following discussion. In some aspects, the second build material 453 may have a different density than the first build material in the solidified state. In some aspects, the second build material 453 may have a different absorbance energy than the first build material in the solidified state as measured by computed tomography (CT) scanning. In some aspects, the second build material 453 has different mechanical wear properties than the first build material. In some aspects, the second build material 453 has greater corrosion resistance than the first build material. Additionally, compared to the first build material, the second build material 453 or insert 453 may differ of at least one of infra-red (IR) emissivity, IR absorptivity or reflectivity, ultra-violet (UV) absorptivity or reflectivity, secondary x-ray emission energy profile, neutron scattering profile, surface energy, coefficient of friction, thermal conductivity, electrical conductivity, acoustic propagation properties, fatigue resistance, wear resistance, tribology, surface properties. In some aspects, the second material has different electrical conductivity than the first build material.

In some aspects, the second build material or insert is a contrast agent. The selection of a suitable contrast agent will depend on the particular application and on the build material or first build material. Suitable contrast agents include those that are non-reactive with any metals contained within build materials (e.g., aluminum, cobalt, nickel) and those that are not themselves contained within the first build material of use. Materials known to be contrast agents in certain circumstances include, but are not limited to, high-atomic numbered metals (e.g., tungsten, osmium). For example, tungsten or osmium may be suitable x-ray CT contrast agents for aluminum or cobalt- or nickel-based superalloys. As another example, if the first build material is cobalt chrome, a suitable contrast agent may be any other metal or non-metal.

In some aspects, the second material 453 is deposited in a single layer. In some aspects, the second material is deposited over multiple layers, to obtain a 3D contrast image.

After the second build material 453 or insert 453 has been deposited, energy beam 270 sinters or melts portions 253*a*, 253*b* of the subsequent layer 253 and deposit 453 (if a second build material), under the control of an irradiation emission directing device, such as galvo scanner 262, forming solidified portions 253*a*', 253*b*' of the subsequent layer 253 and, if applicable, solidified region 453' of the second build material 453 (see, e.g., FIGS. 2D and 3D). Build plate 244 may then be lowered, and recoater arm 246 may evenly spread a subsequent layer of build material over powder bed 242 and the most recently solidified layer of object 252 (253*a*', 253*b*', and 453'; see, e.g., FIGS. 2E and 3E). In some aspects, the subsequent layer of build material is spread over the deposited second build material 453 or insert 453, and the deposited second build material 453 (if deposit 453 is a second build material) is solidified (to 453') before the subsequent layer of build material is spread over it. In some aspects, no subsequent layer of build material is spread over the solidified deposited second build material 453' or insert 453'. In some aspects, second build material 453 or insert 453 is deposited over at least a portion of powder material prior to being fused or solidified by an energy beam, and the deposited second build material 453 and the first build material in layer 253 are fused or solidified by an energy beam. In some aspects, a subsequent layer of build material may be spread over the fused or solidified layer and the solidified deposited second build material 453'.

The energy source may emit radiation at any wavelength suitable for use in additive printing methods, as will be known to those of skill in the art. In some aspects, the energy source may be a laser for producing a laser beam. In some aspects, the energy source may be an electron beam source, such as a filament that emits electrons when a current flows through it.

The energy beam 270 sinters or melts a cross-sectional layer of the object 252 being built under control of an irradiation emission directing device, such as a galvo scanner 262 (see, e.g., FIGS. 2D and 3D). The galvo scanner 262 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 1000 millimeters per second. The build platform 244 is lowered and another layer of powder is spread over the powder bed and object being built (see, e.g., FIGS. 2E and 3E), followed by successive melting/sintering of the powder by the laser 250. The powder layer is typically, for example, 10 to 100 microns in thickness. The process is repeated until the object 252 is completely built up from the melted/sintered powder material. The laser 250 may be controlled by a computer system (not shown) including a processor and a memory. The computer system may determine a scan pattern for each layer and control laser 250 to irradiate the powder material according to the scan pattern. After fabrication of the object 252 is complete, various post-processing procedures may be applied to the object 252. Post processing procedures include removal of excess powder by, for example, blowing or vacuuming. Other post processing procedures include a stress release process. Additionally, thermal and chemical post processing procedures can be used to finish the object 252.

Figure 4A:
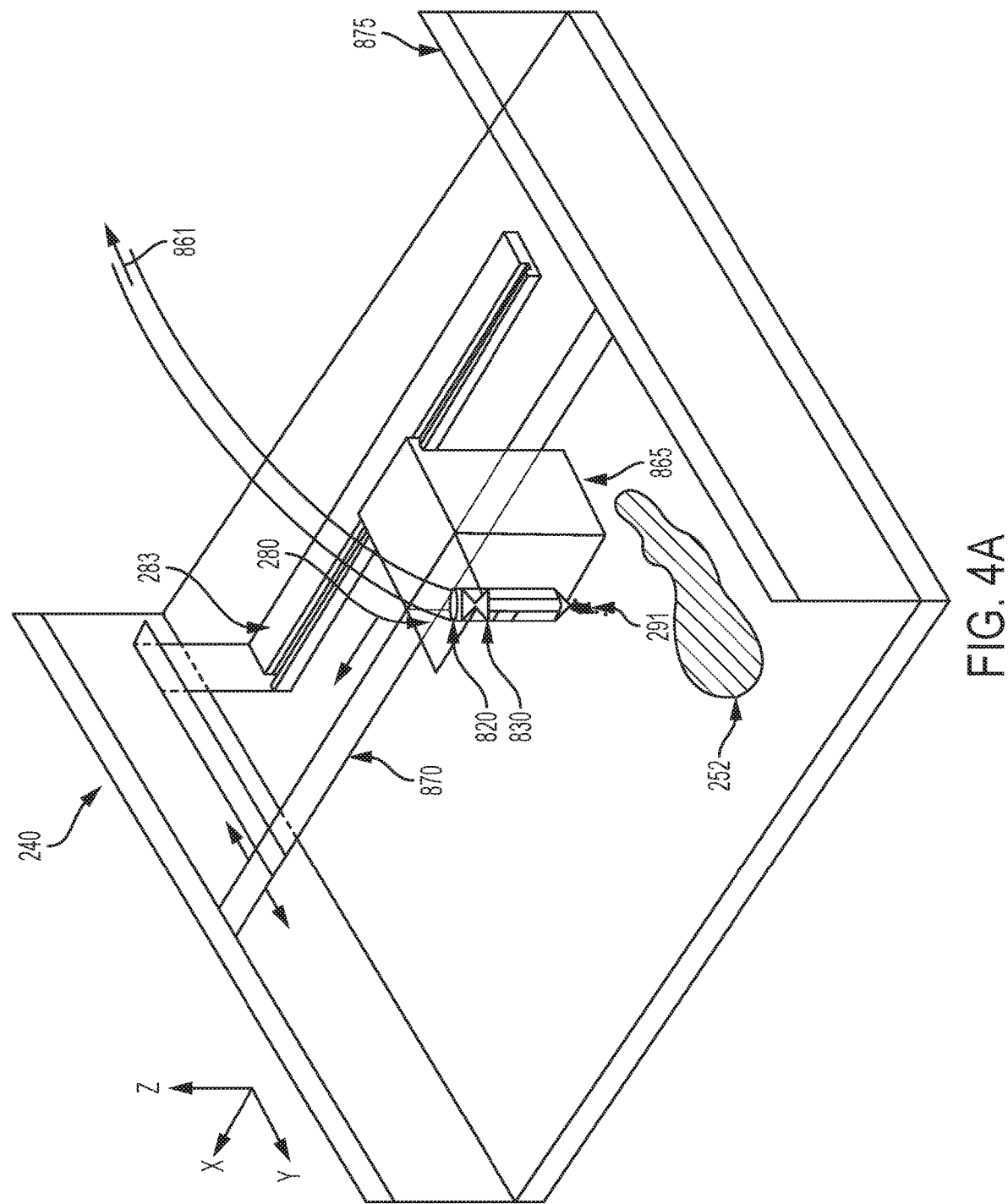
FIG. 4A shows an example of a vacuum unit attached to a positioning system according to a third embodiment of the present disclosure.
Figure 4B:
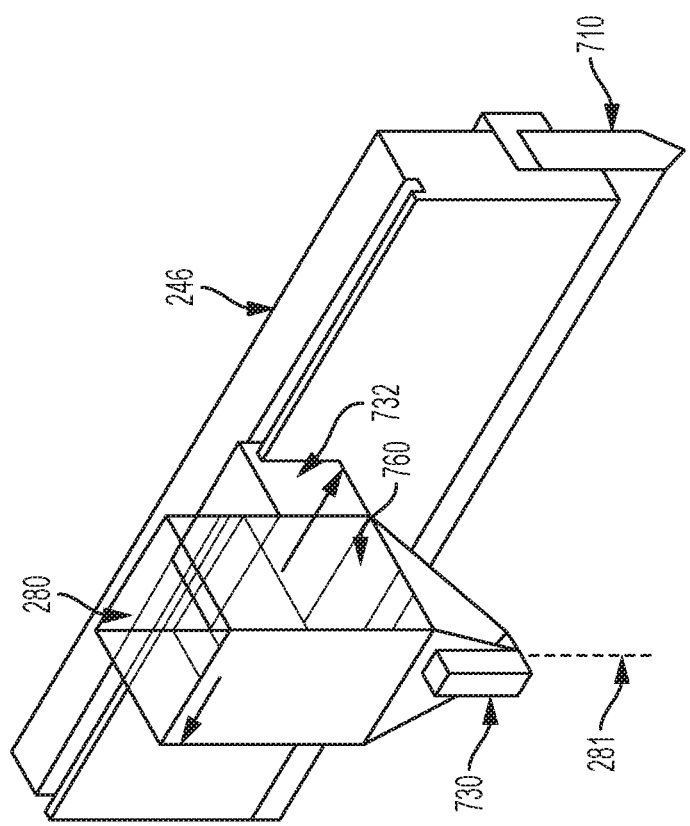
FIG. 4B shows an example of a dispenser unit attached to a recoater arm according to a third embodiment of the present disclosure.
Figure 4B:
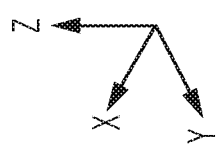

As shown in FIGS. 4A-4B, the dispenser unit 280 may be advantageously attached to the recoater mechanism (e.g., recoater arm 246), and vacuum unit 290 may be advantageously attached to a positioning unit 283, to allow two- or three-dimensional movement of the dispenser unit 280 and vacuum unit 290 around the build environment. FIG. 4A shows an example of a vacuum unit 290 attached to a positioning unit 283, and FIG. 4B shows an example of a dispenser unit 280 attached to the recoater arm 246. The normal motion of the recoater arm 246 enables positioning in one dimension (the direction indicated by the arrow "Y" in FIG. 4B). Utilizing the recoater arm as a rail in conjunction with a mechanism to enable motion along the rail allows motion in a second dimension (the direction indicated by the arrow "X" in FIG. 4B). In one embodiment, this mechanism to enable motion is a linear gear and motor. In a further embodiment, this mechanism is a motor mounted to the recoater arm 246 in conjunction with a drive belt attached to the dispenser unit 283 (FIG. 4B). In a further embodiment, the mechanism of motion is a slot-electric motor or a mag-lev drive. The motion of the build surface allows motion in a third dimension (the direction indicated by the arrow "Z" in FIG. 4B).

In a third embodiment, the vacuum unit 290 is attached to a positioning unit 283. The positioning unit may be a motorized robotic arm, e.g. robotic arm 283 of FIG. 4A, separate from the recoater arm 246, and positioning unit 283 is preferably computer-controlled. In an alternative embodiment, the positioning unit 283 may be a gantry, e.g. a X-Y-Z gantry, whereby a plurality of rails or crossbeams, drive belts, drive screws and/or a Cartesian gantry may be utilized to position the vacuum unit 290 close to the powder bed 242. In yet further alternative embodiments, the positioning unit 283 may be a delta robot, a cable robot, a belt drive, or the like. In certain embodiments, vacuum unit 290 attached to a positioning unit 283 may be used in conjunction with other apparatuses and methods for additive manufacturing using multiple build materials, including, but not limited to, methods of making cast components, such as those described in U.S. patent application Ser. No. 15/056,703, filed Feb. 29, 2016, which is incorporated herein in its entirety by reference.

Motion of vacuum unit 290 (FIG. 4A) along rail 970 and/or using positioning unit 283 as a rail allows movement and positioning of dispenser unit 280 in one dimension (the direction indicated by the arrow "X"); motion of rail 970 along sidewalls 975 allows movement and positioning of dispenser unit 280 in a second dimension (the direction indicated by the arrow "Y"); and motion of the build surface allows movement and positioning of dispenser unit 280 in a third dimension (the direction indicated by the arrow "Z"). Movement along the length of the positioning unit 283 (i.e., using positioning unit 283 as a rail) may be facilitated using a drive motor and a linear gear mechanism, a drive motor and drive belt, slot-electric motor drive, or a mag-lev (magnetic levitation) drive.

FIG. 4A shows a close-up view of vacuum unit 290 according to some aspects of the present disclosure. The vacuum unit 290 shown in FIG. 4A may have identical features to that shown in FIGS. 2F and 3F. All aspects described with respect to vacuum unit 290 in FIGS. 2F and 3F apply with equal force to vacuum unit 290 in FIG. 4A. The additional vertical movement provided in this embodiment is useful in systems with lowering build plates (e.g., as shown in FIG. 1), as well as in systems with a stationary build plate, including, but not limited to, those described in:

U.S. patent application Ser. No. 15/406,467, titled "Additive Manufacturing Using a Mobile Build Volume,", and filed Jan. 13, 2017.

U.S. patent application Ser. No. 15/406,454, titled "Additive Manufacturing Using a Mobile Scan Area,", and filed Jan. 13, 2017.

U.S. patent application Ser. No. 15/406,444, titled "Additive Manufacturing Using a Dynamically Grown Build Envelope,", and filed Jan. 13, 2017.

U.S. patent application Ser. No. 15/406,461, titled "Additive Manufacturing Using a Selective Recoater,", and filed Jan. 13, 2017.

U.S. patent application Ser. No. 15/406,471, titled "Large Scale Additive Machine,", and filed Jan. 13, 2017.

The disclosures of these applications are incorporated herein in their entirety to the extent that they disclose additional aspects of additive manufacturing methods and apparatuses that can be used in conjunction with those disclosed herein.

A key aspect of the invention is the need for the second build material 453 or the insert 453 to be somehow contained and/or deposited close to the build surface. This is because, if the second build material 453 or the insert 453 is not confined or released sufficiently close to the build surface, it would be difficult or even impossible to control where the second build material 453 or the insert 453 is deposited. It is necessary that the second build material 453 or the insert 453 is deposited from a height of no more than 2 cm away from the build surface in order to be sufficiently close, preferably 0.1-2 cm. For this reason, it may be advantageous that the recoater arm 246 in FIG. 4B is operable to further move and position the dispenser 760 in a vertical direction (e.g., as indicated by the arrow "Z" in FIG. 4B). Additionally, in certain embodiments, the recoater arm 246 may be operable to move and position the dispenser unit 280 in the direction indicated by the arrow "Y" in FIG. 4B. Additionally, movement along the length of the recoater arm 246 itself allows movement and positioning in a second direction (e.g. as indicated by the arrow "X" in FIG. 4B). Importantly, the proximity of the dispenser unit 280 on recoater arm 246 to the powder bed 242 ensures that the dispenser unit 280 is sufficiently close to the powder bed 242 and the build surface. Movement along the length of the recoater arm 246 may be facilitated using a drive motor and a linear gear mechanism, a drive motor and drive belt, slot-electric motor drive, or a mag-lev (magnetic levitation) drive.

FIG. 4B shows a close-up view of dispenser unit 280 according to a second embodiment of the present disclosure. The dispenser unit 280 shown in FIG. 4B may have identical features to that shown in FIGS. 2F and 3G. All aspects described with respect to dispenser unit 280 attached to recoater arm 246 (FIG. 2F) apply with equal force to dispenser unit 280 attached to recoater arm 246 (FIG. 4B).

In some embodiments, apparatus 240 may be equipped with one or both of vacuum unit 290 and dispenser unit 280. In some embodiments, only one of vacuum unit 290 and dispenser unit 280 is attached to the recoater mechanism, and the other of vacuum unit 290 and dispenser unit 280 is attached to a separate positioning unit 283. In some embodiments, both vacuum unit 290 and dispenser unit 280 are attached to one or more positioning units 283 separate from the recoater mechanism. All aspects described with respect to the vacuum unit 290 or the dispenser unit 280 attached to recoater arm 246 apply with equal force to the vacuum unit 290 or the dispenser unit 280 attached to positioning unit 283.

In some embodiments, the mechanism for fusing the first and/or second build material is binder jetting, in which a binder material is applied to selected regions of a powder material to produce a layer of bonded powder material at the selected regions. In such embodiments, the mechanism for fusing the first and/or second build material may include spraying the first and/or second build material with a binder material. In such embodiments, the apparatus for additive manufacturing includes a mechanism for fusing the first and/or second build material by binder jetting, such as by spraying a liquid binder onto the powder bed such as by using a binder material spray nozzle or an ink-jet print head, either in addition to or in place of an energy source. Binder jetting according to the present disclosure may be carried out using any suitable methods, materials, and/or apparatuses known in the art, including but not limited to those disclosed in U.S. Patent Application Publication No. 2002/0106412 and U.S. Pat. No. 5,387,380. Each of these references is incorporated herein by reference in its entirety.

The methods and systems described herein may be used with any build material(s) suitable for use in additive printing, as will be known to those of ordinary skill in the art. In some aspects, the first and or second build material is a powdered metal. In some aspects, the first and/or second build material is cobalt chrome, stainless steels, tooling steel, maraging steel, aluminum alloys, nickel alloys, copper alloys, or titanium alloys. In some aspects, the build material is a liquid polymer. In some aspects, the first and or second build material is a powdered polymer.

The methods and systems of the present disclosure may be used in conjunction with additive printing methods known in the art, including, but not limited to direct metal laser melting (DMLM), fused deposition modeling (FDM), stereolithography (SLA), selective laser melting (SLM), binder jetting, and powder-based processes. In some embodiments, the present disclosure is related to a method of fabricating an object using DMLM. In some aspects, the methods and systems of the present disclosure may be used in conjunction with DMLM methods comprising building at least one layer of a chamber wall, providing a layer of powder within the at least one layer of a chamber wall by passing a recoater arm over the layer of powder, irradiating the layer of powder to form a fused region, and then repeating until the object is formed within the chamber wall. The following patent applications include disclosure of these various aspects and their use:

U.S. patent application Ser. No. 15/406,467, titled "Additive Manufacturing Using a Mobile Build Volume,", and filed Jan. 13, 2017.

U.S. patent application Ser. No. 15/406,454, titled "Additive Manufacturing Using a Mobile Scan Area,", and filed Jan. 13, 2017.

U.S. patent application Ser. No. 15/406,444, titled "Additive Manufacturing Using a Dynamically Grown Build Envelope,", and filed Jan. 13, 2017.

U.S. patent application Ser. No. 15/406,461, titled "Additive Manufacturing Using a Selective Recoater,", and filed Jan. 13, 2017.

U.S. patent application Ser. No. 15/406,471, titled "Large Scale Additive Machine,", and filed Jan. 13, 2017.

The disclosures of these applications are incorporated herein in their entirety to the extent that they disclose additional aspects of additive manufacturing methods and apparatuses that can be used in conjunction with those disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of fabricating an object, comprising:
   (a) providing a given layer of a first build material:
   (b) fusing at least a portion of the given layer of the first build material to form at least one fused region;
   (c) providing a subsequent layer of the first build material;
   (d) fusing at least a portion of the subsequent layer of the first build material: and
   (e) repeating steps (c) and (d) until the object is formed,
   (d) wherein, between steps (c) and (d) or between steps (c) and (d) during at least one repetition set forth in step (e):
      removing a portion of the subsequent layer of the first build material to expose an exposed portion of a fused region through the subsequent layer of build material,
      depositing a second build material or insert consisting of a pre fused portion of the second build material; and
      moving a recoater arm after depositing the second build material or insert, and
      wherein the providing the subsequent layer of the first build material comprises moving the recoater arm to move the first build material onto a build platform from a reservoir on a lateral side of the build platform, and
      wherein the depositing the second build material or the insert comprises dispensing the second build material or the insert from a dispenser vertically above the build platform.

2. The method of claim 1, wherein the removing is done by vacuum.

3. The method of claim 1, wherein the second build material or insert is deposited over at least a portion of the exposed portion of the fused region.

4. The method of claim 1, wherein the fusing comprises irradiating with a laser beam or with an electron beam.

5. The method of claim 1, wherein the fusing comprises binder jetting.

6. The method of claim 1, wherein the second build material or insert has different electromagnetic absorption or reflection characteristics from the first build material.

7. The method of claim 6, wherein the absorption or reflection characteristics are measured using x-rays, ultraviolet, infrared, or computed tomography methods.

8. A method of fabricating an object on a build platform, comprising:
   (a) providing a given layer of a first build material;
   (b) fusing at least a portion of the given layer of a first build material, to form a fused region;
   (c) providing a subsequent layer of the first build material by moving a recoater arm laterally to move the first build material onto the build platform from a reservoir on a lateral side of the build platform;
   (d) fusing at least a portion of the subsequent later of the first build material; and
   (e) repeating steps (c) and (d) until the object is formed, wherein, between steps (c) and (d) during at least one repetition set forth in step (e), selectively depositing, via a dispenser vertically above the build platform, a second build material or insert consisting of a pre-fused portion of the second build material over at least a portion of the subsequent layer of the first build material, to form a bilayer of the first build material and the second build material, wherein the first build material differs from the second build material in one or more physicochemical properties, and
   wherein the bilayer of the first build material and the second build material are fused to form a fused region of the fused first build material and the fused second build material.

9. The method of claim 8, wherein the second build material or insert has different electromagnetic absorption or reflection characteristics from the first build material.

10. The method of claim 9, where the absorption or reflection characteristics are measured using x-rays, ultraviolet, infrared, or computed tomography methods.

* * * * *